United States Patent
Pope et al.

(10) Patent No.: US 10,212,024 B2
(45) Date of Patent: Feb. 19, 2019

(54) TECHNIQUES FOR MULTI-STAGE ANALYSIS OF MEASUREMENT DATA WITH EVENT STREAM PROCESSING

(71) Applicant: SAS Institute Inc., Cary, NC (US)

(72) Inventors: David Carter Pope, Raleigh, NC (US); Blanden Scott Chisum, Apex, NC (US); Brett Farina, Clayton, NC (US); Mark Joseph Konya, Chesterfield, MO (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/997,371

(22) Filed: Jun. 4, 2018

(65) Prior Publication Data

US 2018/0351786 A1    Dec. 6, 2018

Related U.S. Application Data

(60) Provisional application No. 62/514,673, filed on Jun. 2, 2017, provisional application No. 62/663,284, filed on Apr. 27, 2018.

(51) Int. Cl.
*G06F 15/18* (2006.01)
*H04L 12/24* (2006.01)
(Continued)

(52) U.S. Cl.
CPC ...... *H04L 41/0654* (2013.01); *H04L 41/0813* (2013.01); *H04L 45/28* (2013.01);
(Continued)

(58) Field of Classification Search
None
See application file for complete search history.

(56) References Cited

U.S. PATENT DOCUMENTS 9,013,173 B2   4/2015   Veillette
9,396,438 B2   6/2016   McConky et al.
(Continued)

OTHER PUBLICATIONS

Foreman, James Christoper; Gurugubelli, Dheeraj. "Cyber Attack Surface Analysis of Advanced Metering Infrastructure" The Electricity Journal, Jul. 17, 2016.
(Continued)

*Primary Examiner* — Alex Skripnikov

(57) ABSTRACT

Various embodiments are generally directed to systems for multi-stage measurement data analysis (MMDA), such as for evaluation and/or validation of data received from a measurement device, for instance. Some embodiments are particularly directed to a MMDA system that utilizes event stream processing (ESP) to provide near real-time validation of measurement data, at least in part, by detecting losses in the measurement data. In many embodiments, the MMDA system may detect technical losses (e.g., due to equipment malfunction) and/or non-technical losses (e.g., due to compromised equipment). For example, the MMDA system may receive measurement data generated by an electrical meter and determine the electrical meter is malfunctioning by detecting a technical loss in the measurement data. In many embodiments, the MMDA system may utilize both direct and indirect measurement data transmitted via separate communication paths to provide near real-time validation of measurement data.

30 Claims, 29 Drawing Sheets

(51) Int. Cl.
  *H04L 29/08* (2006.01)
  *H04L 12/703* (2013.01)
(52) U.S. Cl.
  CPC .............. *H04L 67/10* (2013.01); *H04L 67/34* (2013.01); *G06F 15/18* (2013.01)

(56) References Cited

U.S. PATENT DOCUMENTS

| | | |
|---|---|---|
| 9,595,006 B2 | 3/2017 | Dhurandhar et al. |
| 2011/0153236 A1 | 6/2011 | Montreuill et al. |
| 2014/0074670 A1 | 3/2014 | Garrity et al. |
| 2014/0236506 A1 | 8/2014 | Nikovski et al. |
| 2015/0233983 A1 | 8/2015 | Siebel et al. |
| 2017/0006135 A1* | 1/2017 | Siebel .................... H04L 67/02 |
| 2017/0038415 A1 | 2/2017 | Dasgupta et al. |
| 2017/0082665 A1* | 3/2017 | Bandyopadhyay .... G01D 4/004 |
| 2018/0107941 A1* | 4/2018 | Siebel ................. H04B 17/391 |

OTHER PUBLICATIONS

Jiang et al., "Energy-Theft Detection Issues for Advanced Metering Infrastructure in Smart Grid", Tisinghua Science and Technology, ISSN 1007-0214 01/12, pp. 105-120, vol. 19, No. 2, Apr. 2014.
Liu, Xiufeng; Nielsen, Per Sieverts. "Regression-based Online Anomaly Detection for Smart Grid Data", arXiv:1606.05781v1 [cs.DB] Jun. 18, 2016.

* cited by examiner

| Meter_Number | Time | KWH | KWH_Monitored | Flag_Alert |
|---|---|---|---|---|
| 111111 | 7/30/10 4:21 AM | 0.009714 | 0.009714 | 0 |
| 222222 | 7/30/10 4:21 AM | 0.025036 | 0.025036 | 0 |
| 333333 | 7/30/10 4:21 AM | 0.021843 | 0.021843 | 0 |
| 444444 | 7/30/10 4:21 AM | 0.018345 | 0.018345 | 0 |
| 555555 | 7/30/10 4:21 AM | 0.013667 | 0.013667 | 0 |
| 111111 | 7/30/10 4:22 AM | 0.009714 | 0.009714 | 0 |
| 222222 | 7/30/10 4:22 AM | 0.025036 | 0.025036 | 0 |
| 333333 | 7/30/10 4:22 AM | 0.021843 | 0.021843 | 0 |
| 444444 | 7/30/10 4:22 AM | 0.018345 | 0.018345 | 0 |
| 555555 | 7/30/10 4:22 AM | 0.013667 | 0.013667 | 0 |
| 111111 | 7/30/10 4:23 AM | 0.009710 | 0.009710 | 0 |
| 222222 | 7/30/10 4:23 AM | 0.025029 | 0.025029 | 0 |
| 333333 | 7/30/10 4:23 AM | 0.002713 | 0.002713 | 0 |
| 444444 | 7/30/10 4:23 AM | 0.019388 | 0.151038 | 1 |
| 555555 | 7/30/10 4:23 AM | 0.013121 | 0.013121 | 0 |
| 111111 | 7/30/10 4:24 AM | 0.009706 | 0.009706 | 0 |
| 222222 | 7/30/10 4:24 AM | 0.024752 | 0.024752 | 0 |
| 333333 | 7/30/10 4:24 AM | 0.002625 | 0.002625 | 0 |
| 444444 | 7/30/10 4:24 AM | 0.020211 | 0.020211 | 0 |
| 555555 | 7/30/10 4:24 AM | 0.017123 | 0.017123 | 0 |
| 111111 | 7/30/10 4:25 AM | 0.009708 | 0.009708 | 0 |
| 222222 | 7/30/10 4:25 AM | 0.024760 | 0.024760 | 0 |
| 333333 | 7/30/10 4:25 AM | 0.002800 | 0.002800 | 0 |
| 444444 | 7/30/10 4:25 AM | 0.020379 | 0.020379 | 0 |
| 555555 | 7/30/10 4:25 AM | 0.017123 | 0.017123 | 0 |

| Variable | Y11 | Y12 | Y21 | Y22 | Y23 | Y31 | Y32 | Y33 | Y34 |
|---|---|---|---|---|---|---|---|---|---|
| TS | 0.25 | 0.25 | 0.25 | 0.25 | 0.25 | 0.25 | 0.25 | 0.25 | 0.25 |
| PI | 3.14159 | 3.14159 | 3.14159 | 3.14159 | 3.14159 | 3.14159 | 3.14159 | 3.14159 | 3.14159 |
| N_OBS | 96 | 96 | 96 | 96 | 96 | 96 | 96 | 96 | 96 |
| T_COS | 24 | 24 | 12 | 12 | 12 | 8 | 8 | 8 | 8 |
| T_SIN | 1 | 1 | 1 | 1 | 1 | 2 | 2 | 2 | 2 |
| F_COS | 0.041667 | 0.041667 | 0.083333 | 0.083333 | 0.083333 | 0.125 | 0.125 | 0.125 | 0.125 |
| F_SIN | 1 | 1 | 1 | 1 | 1 | 0.5 | 0.5 | 0.5 | 0.5 |
| W_COS | 0.261799 | 0.261799 | 0.523598 | 0.523598 | 0.523598 | 0.785398 | 0.785398 | 0.785398 | 0.785398 |
| W_SIN | 0.261799 | 6.28318 | 6.28318 | 6.28318 | 6.28318 | 3.14159 | 3.14159 | 3.14159 | 3.14159 |
| A | 1 | 1 | 1 | 1 | 1 | 1 | 1 | 1 | 1 |
| B | 0 | 0 | 0.25 | 0.25 | 0.25 | 0.1 | 0.1 | 0.1 | 0.1 |
| PH_COS | 3.1416 | 2.3562 | 0 | 0.7854 | 1.5708 | 0 | 0.7854 | 1.5708 | 0 |
| PH_SIN | 0 | 0 | 0 | 0.7854 | 0.3927 | 0 | 0 | 0 | 0 |
| ERR_WT | 0.01 | 0.005 | 0.01 | 0.01 | 0.005 | 0.005 | 0.005 | 0.005 | 0.005 |
| OFFSET | 2 | 2 | 2 | 2 | 1.5 | 2 | 2.5 | 2 | 1.5 |

Y(T) = OFFSET + A*COS(W_COS*T+PH_COS) + B*SIN(W_SIN*T+PH_SIN) + ERR_WT*RAND(-50,50)

FIG. 16C
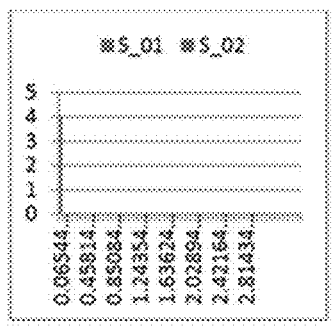
Spectral Densities for Y11 and12
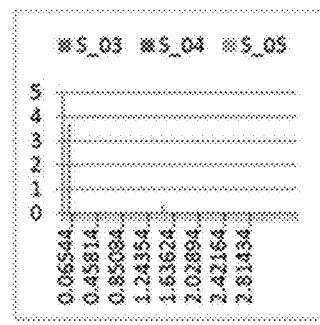
Spectral Densities for Y21, Y22, Y23
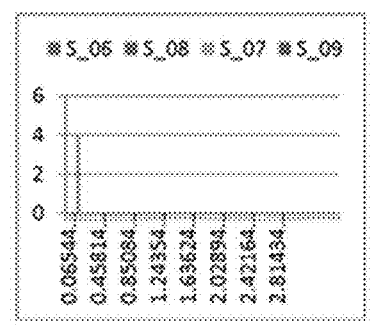
Spectral Densities for Y31~Y34

FIG. 16D

| | | Correlation Matrix | | | | | | | | |
|---|---|---|---|---|---|---|---|---|---|---|
| | | S_01 | S_02 | S_03 | S_04 | S_05 | S_06 | S_07 | S_08 | S_09 |
| S_01 | Spectral Density of Y11 | 1.0000 | 0.9998 | -.0279 | -.0198 | -.0242 | -.0239 | -.0251 | -.0248 | -.0246 |
| S_02 | Spectral Density of Y12 | 0.9998 | 1.0000 | -.0267 | -.0095 | -.0230 | -.0217 | -.0231 | -.0228 | -.0225 |
| S_03 | Spectral Density of Y21 | -.0279 | -.0267 | 1.0000 | 0.9994 | 0.9995 | -.0270 | -.0253 | -.0263 | -.0258 |
| S_04 | Spectral Density of Y22 | -.0198 | -.0095 | 0.9994 | 1.0000 | 0.9993 | -.0268 | -.0259 | -.0258 | -.0254 |
| S_05 | Spectral Density of Y23 | -.0242 | -.0230 | 0.9995 | 0.9993 | 1.0000 | -.0244 | -.0228 | -.0237 | -.0233 |
| S_06 | Spectral Density of Y31 | -.0239 | -.0217 | -.0270 | -.0268 | -.0244 | 1.0000 | 0.9999 | 0.9999 | 0.9999 |
| S_07 | Spectral Density of Y32 | -.0251 | -.0231 | -.0253 | -.0259 | -.0228 | 0.9999 | 1.0000 | 1.0000 | 1.0000 |
| S_08 | Spectral Density of Y33 | -.0248 | -.0228 | -.0263 | -.0258 | -.0237 | 0.9999 | 1.0000 | 1.0000 | 1.0000 |
| S_09 | Spectral Density of Y34 | -.0246 | -.0225 | -.0258 | -.0254 | -.0233 | 0.9999 | 1.0000 | 1.0000 | 1.0000 |

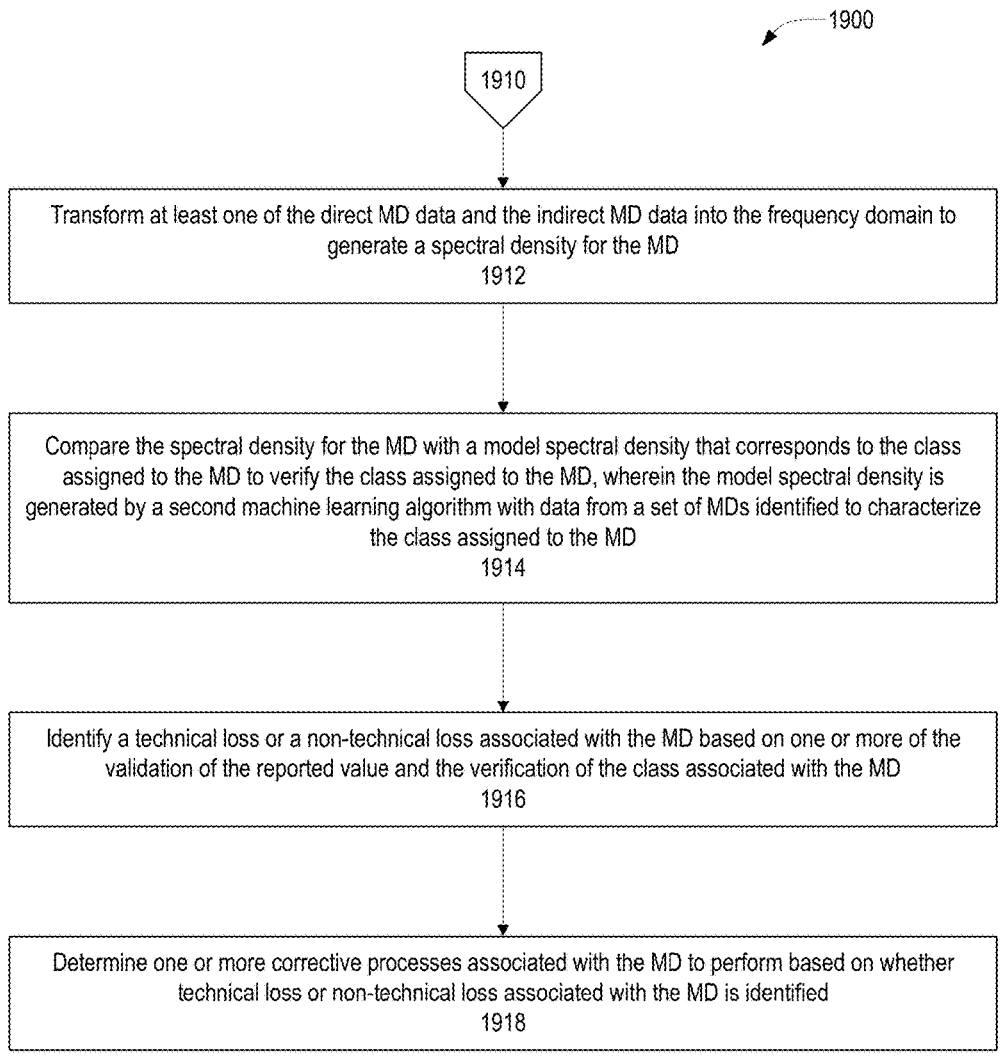

TECHNIQUES FOR MULTI-STAGE ANALYSIS OF MEASUREMENT DATA WITH EVENT STREAM PROCESSING

CROSS-REFERENCE TO RELATED APPLICATIONS

This application claims the benefit of priority under 35 U.S.C. § 119(e) to U.S. Provisional Application Ser. No. 62/514,673 filed Jun. 2, 2017 and U.S. Provisional Application Ser. No. 62/663,284 filed Apr. 27, 2018, the entireties of which are incorporated herein by reference.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and a storage to store instructions that, when executed by the processor, cause the processor to perform operations comprising: identify direct measurement device data comprising a measured value generated by a measurement device (MD), the measured value received as part of a first data stream comprising a series of measured values over an interval in a time domain, the first data stream communicated via an event stream processing (ESP) interface of the measurement device; identify indirect MD data comprising a reported value associated with generation by the MD, the reported value and a unique identifier of the MD received as part of a second data stream comprising a series of reported values over the interval in the time domain and the unique identifier of the MD, the series of reported values associated with generation by the MD in a staging area based on the unique identifier received in the second data stream, the staging area communicatively coupled with the MD via a neighborhood area network (NAN) and the staging area comprising a temporary storage to aggregate reported values for a group of MDs associated with a geographic area of the MD; generate an expected value for the reported value with a first machine learning algorithm based on a class assigned to the MD and a portion of the series of reported values received in the second data stream prior to the reported value being received; compare the reported value to the expected value and the reported value to the measured value to validate the reported value associated with generation by the MD in the staging area communicatively coupled to the MD via the NAN; transform at least one of the direct MD data and the indirect MD data into the frequency domain to generate a spectral density for the MD; compare the spectral density for the MD with a model spectral density that corresponds to the class assigned to the MD to verify the class assigned to the MD, wherein the model spectral density is generated by a second machine learning algorithm with data from a set of MDs identified to characterize the class assigned to the MD; identify a technical loss or a non-technical loss associated with the MD based on one or more of the validation of the reported value and the verification of the class associated with the MD; and/or determine one or more corrective processes associated with the MD to perform based on whether technical loss or non-technical loss associated with the MD is identified.

In some embodiments, the processor may be caused to perform operations comprising decomposing the at least one of the direct MD data and the indirect MD data into a summation of periodic functions to transform the at least one of the direct MD data and the indirect MD data into the frequency domain to generate the spectral density for the MD.

In one or more embodiments the processor may be caused to perform operations comprising: correlate an equipment type with at least one of the periodic functions included in the summation; and/or utilize the equipment type to generate the expected value for the reported value.

In many embodiments, the processor may be caused to perform operations to compare of the spectral density for the MD with the model spectral density that corresponds to the class assigned to the MD to verify the class assigned to the MD comprising: perform clustering with correlation analysis or principal component analysis of the spectral density for the MD and a plurality of additional spectral densities for the set of MDs identified to characterize the class assigned to the MD; and/or determine whether the MD has similar frequency content similar to one or more of the set of MDs identified to characterize the class assigned to the MD based on the clustering.

In several embodiments, the reported value may be aggregated in a second staging area communicatively coupled to the staging area in the NAN by a regional area network (RAN) prior to receival as part of the second live steam, the second staging area comprising a temporary storage to aggregate reported values for a second group of MDs associated with a geographic region of the MD, the geographic region of the MD comprising the geographic area of the MD and a second geographic area of at least one other MD.

In one or more embodiments, the processor may be caused to perform operations comprising combine the first data stream and the second data stream into a data record stream associated with the MD, wherein the data record stream is provided to a database for storage, and wherein the first and second machine learning algorithms are trained with data stored in the database as part of a plurality of data record streams associated with a plurality of MDs.

In some embodiments, the data from the set of MDs identified to characterize the class assigned to the MD used by the second machine learning algorithm to generate the model spectral density may be stored in the database as part of a respective data record streams corresponding to each of the set of MDs identified to characterize the class assigned to the MD.

In many embodiments, training at least one of the first and second machine learning algorithms may utilize one or more of support vector machines (SVMs), Fourier transforms, logistic regression, deep neural networks (DNNs), principal component analysis (PCA), clustering in the frequency domain.

In several embodiments, the processor may be caused to perform operations comprising identify a non-technical loss associated with the MD based on verification of the reported value indicating the reported value exceeds the measured value.

In various embodiments, the processor may be caused to perform operations comprising assign the class to the MD based on one or more properties of a client account that corresponds to the MD.

Various embodiments described herein may include a computer-implemented method, comprising: identifying direct measurement device data comprising a measured value generated by a measurement device (MD), the measured value received as part of a first data stream comprising a series of measured values over an interval in a time domain, the first data stream communicated via an event stream processing (ESP) interface of the measurement device; identifying indirect MD data comprising a reported value associated with generation by the MD, the reported value and a unique identifier of the MD received as part of a second data stream comprising a series of reported values over the interval in the time domain and the unique identifier of the MD, the series of reported values associated with generation by the MD in a staging area based on the unique identifier received in the second data stream, the staging area communicatively coupled with the MD via a neighborhood area network (NAN) and the staging area comprising a temporary storage to aggregate reported values for a group of MDs associated with a geographic area of the MD; generating an expected value for the reported value with a first machine learning algorithm based on a class assigned to the MD and a portion of the series of reported values received in the second data stream prior to the reported value being received; comparing the reported value to the expected value and the reported value to the measured value to validate the reported value associated with generation by the MD in the staging area communicatively coupled to the MD via the NAN; transforming at least one of the direct MD data and the indirect MD data into the frequency domain to generate a spectral density for the MD; comparing the spectral density for the MD with a model spectral density that corresponds to the class assigned to the MD to verify the class assigned to the MD, wherein the model spectral density is generated by a second machine learning algorithm with data from a set of MDs identified to characterize the class assigned to the MD; identifying a technical loss or a non-technical loss associated with the MD based on one or more of the validation of the reported value and the verification of the class associated with the MD; and/or determining one or more corrective processes associated with the MD to perform based on whether technical loss or non-technical loss associated with the MD is identified.

Some embodiments may include decomposing the at least one of the direct MD data and the indirect MD data into a summation of periodic functions to transform the at least one of the direct MD data and the indirect MD data into the frequency domain to generate the spectral density for the MD.

Many embodiments may include correlating an equipment type with at least one of the periodic functions included in the summation; and/or utilizing the equipment type to generate the expected value for the reported value.

In several embodiments, comparing of the spectral density for the MD with the model spectral density that corresponds to the class assigned to the MD to verify the class assigned to the MD may include: performing clustering with correlation analysis or principal component analysis of the spectral density for the MD and a plurality of additional spectral densities for the set of MDs identified to characterize the class assigned to the MD; and/or determining whether the MD has similar frequency content similar to one or more of the set of MDs identified to characterize the class assigned to the MD based on the clustering.

In one or more embodiments, the reported value may be aggregated in a second staging area communicatively coupled to the staging area in the NAN by a regional area network (RAN) prior to receival as part of the second live steam, the second staging area comprising a temporary storage to aggregate reported values for a second group of MDs associated with a geographic region of the MD, the geographic region of the MD comprising the geographic area of the MD and a second geographic area of at least one other MD.

Some embodiments may include combining the first data stream and the second data stream into a data record stream associated with the MD, wherein the data record stream is provided to a database for storage, and wherein the first and second machine learning algorithms are trained with data stored in the database as part of a plurality of data record streams associated with a plurality of MDs.

In one or more embodiments the data from the set of MDs identified to characterize the class assigned to the MD used by the second machine learning algorithm to generate the model spectral density may be stored in the database as part of a respective data record streams corresponding to each of the set of MDs identified to characterize the class assigned to the MD.

In some embodiments, training at least one of the first and second machine learning algorithms may utilize one or more of support vector machines (SVMs), Fourier transforms, logistic regression, deep neural networks (DNNs), principal component analysis (PCA), clustering in the frequency domain.

Various embodiments may include identifying a non-technical loss associated with the MD based on verification of the reported value indicating the reported value exceeds the measured value.

One or more embodiments may include assigning the class to the MD based on one or more properties of a client account that corresponds to the MD.

Various embodiments described herein may include a computer-program product tangibly embodied in a non-transitory machine-readable storage medium, the computer-program product including instructions operable to cause a processor to perform operations comprising: identify direct measurement device data comprising a measured value generated by a measurement device (MD), the measured value received as part of a first data stream comprising a series of measured values over an interval in a time domain, the first data stream communicated via an event stream processing (ESP) interface of the measurement device; identify indirect MD data comprising a reported value associated with generation by the MD, the reported value and a unique identifier of the MD received as part of a second data stream comprising a series of reported values over the interval in the time domain and the unique identifier of the MD, the series of reported values associated with generation by the MD in a staging area based on the unique identifier received in the second data stream, the staging area communicatively coupled with the MD via a neighborhood area network (NAN) and the staging area comprising a temporary storage to aggregate reported values for a group of MDs associated with a geographic area of the MD; generate an expected value for the reported value with a first machine learning algorithm based on a class assigned to the MD and a portion of the series of reported values received in the second data stream prior to the reported value being received; compare the reported value to the expected value and the reported value to the measured value to validate the reported value associated with generation by the MD in the staging area communicatively coupled to the MD via the NAN; transform at least one of the direct MD data and the indirect MD data into the frequency domain to generate a spectral density for the MD; compare the spectral density for the MD with a model spectral density that corresponds to the class assigned to the MD to verify the class assigned to the MD, wherein the model spectral density is generated by a second machine learning algorithm with data from a set of MDs identified to characterize the class assigned to the MD; identify a technical loss or a non-technical loss associated with the MD based on one or more of the validation of the reported value and the verification of the class associated with the MD; and/or determine one or more corrective processes associated with the MD to perform based on whether technical loss or non-technical loss associated with the MD is identified.

Some embodiments may include instructions operable to cause the processor to perform operations comprising decomposing the at least one of the direct MD data and the indirect MD data into a summation of periodic functions to transform the at least one of the direct MD data and the indirect MD data into the frequency domain to generate the spectral density for the MD.

One or more embodiments may include instructions operable to cause the processor to perform operations comprising: correlate an equipment type with at least one of the periodic functions included in the summation; and/or utilize the equipment type to generate the expected value for the reported value.

Many embodiments may include instructions operable to cause the processor to perform operations to compare of the spectral density for the MD with the model spectral density that corresponds to the class assigned to the MD to verify the class assigned to the MD comprising: perform clustering with correlation analysis or principal component analysis of the spectral density for the MD and a plurality of additional spectral densities for the set of MDs identified to characterize the class assigned to the MD; and/or determine whether the MD has similar frequency content similar to one or more of the set of MDs identified to characterize the class assigned to the MD based on the clustering.

In several embodiments the reported value may be aggregated in a second staging area communicatively coupled to the staging area in the NAN by a regional area network (RAN) prior to receival as part of the second live steam, the second staging area comprising a temporary storage to aggregate reported values for a second group of MDs associated with a geographic region of the MD, the geographic region of the MD comprising the geographic area of the MD and a second geographic area of at least one other MD.

One or more embodiments may include instructions operable to cause the processor to perform operations comprising combine the first data stream and the second data stream into a data record stream associated with the MD, wherein the data record stream is provided to a database for storage, and wherein the first and second machine learning algorithms are trained with data stored in the database as part of a plurality of data record streams associated with a plurality of MDs.

In various embodiments, the data from the set of MDs identified to characterize the class assigned to the MD used by the second machine learning algorithm to generate the model spectral density may be stored in the database as part of a respective data record streams corresponding to each of the set of MDs identified to characterize the class assigned to the MD.

In one or more embodiments, training at least one of the first and second machine learning algorithms may utilize one or more of support vector machines (SVMs), Fourier transforms, logistic regression, deep neural networks (DNNs), principal component analysis (PCA), clustering in the frequency domain.

Many embodiments may include instructions operable to cause the processor to perform operations comprising identify a non-technical loss associated with the MD based on verification of the reported value indicating the reported value exceeds the measured value.

Some embodiments may include instructions operable to cause the processor to perform operations comprising assign the class to the MD based on one or more properties of a client account that corresponds to the MD.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 15A-15C illustrate a first example of measurement data evaluation and validation, according to some embodiments of the present technology.

FIGS. 16A-16E illustrate a second example of measurement data evaluation and validation, according to some embodiments of the present technology.

FIGS. 19A and 19B illustrate a third example of a logic flow, according to some embodiments of the present technology.

DETAILED DESCRIPTION

Figure 1:
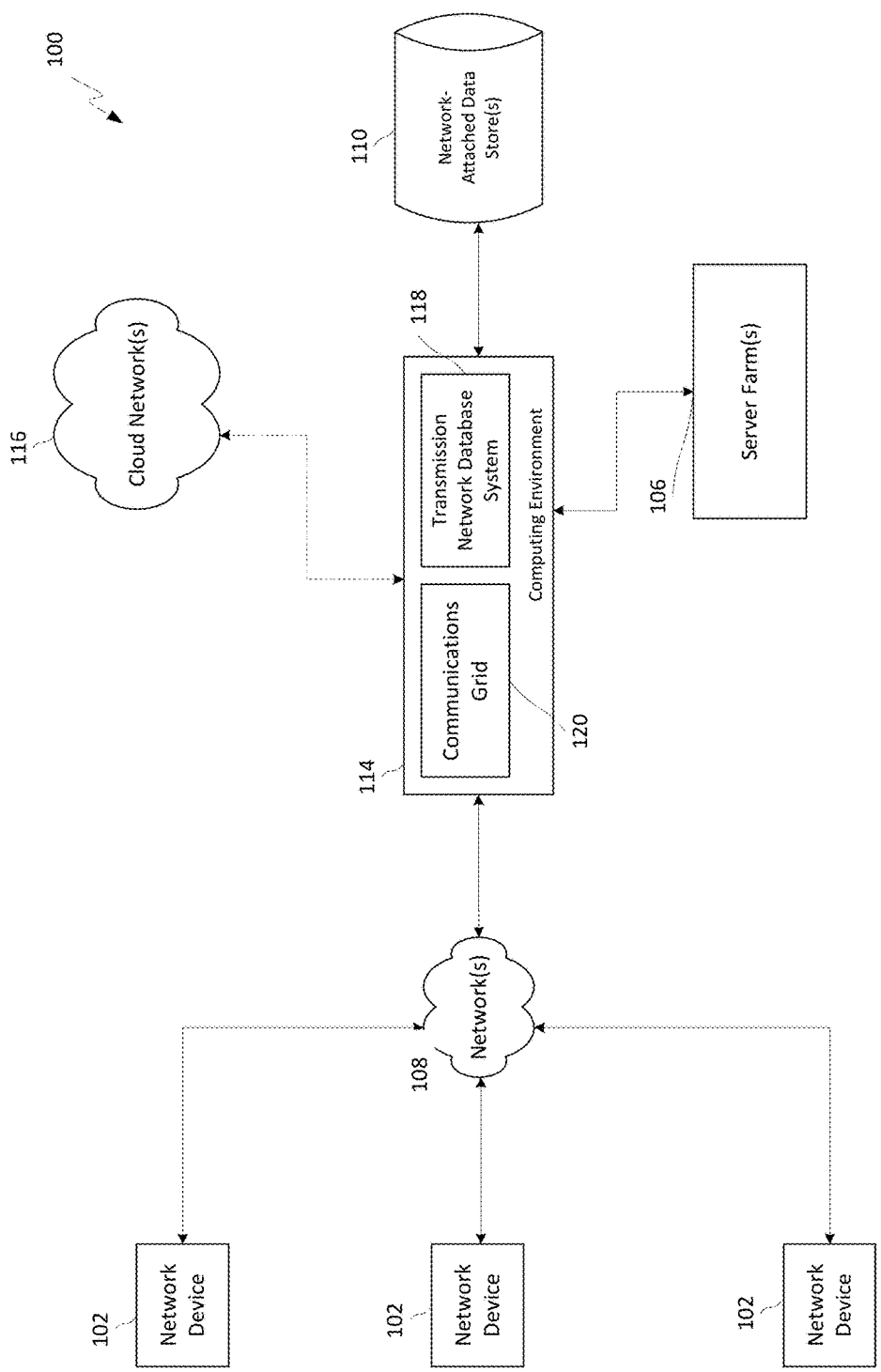
FIG. 1 illustrates a block diagram that provides an illustration of the hardware components of a computing system, according to some embodiments of the present technology.

Various embodiments are generally directed to systems for multi-stage measurement data analysis (MMDA), such as for evaluation and/or validation of data received from a measurement device, for instance. Some embodiments are particularly directed to a MMDA system that utilizes event stream processing (ESP) to provide near real-time validation of measurement data, at least in part, by detecting losses in the measurement data. In many embodiments, the MMDA system may detect technical losses (e.g., due to equipment malfunction) and/or non-technical losses (e.g., due to compromised equipment). For example, the MMDA system may receive measurement data generated by an electrical meter and determine the electrical meter is malfunctioning by detecting a technical loss in the measurement data. In many embodiments, the MMDA system may utilize both direct and indirect measurement data transmitted via separate communication paths to provide near real-time validation of measurement data. In several embodiments, the MMDA system may generate one or more models or expected values based on historical measurement data collected from one or more measurement devices. In several such embodiments, the models and/or predicted values may be utilized, at least in part to evaluate and/or validate measurement data. These and other embodiments are described and claimed.

Some challenges facing measurement data analysis systems include the inability to evaluate and/or validate measurement data in near real-time. Another challenge facing measurement data analysis systems includes vulnerability to malicious actors. For instance, the use of staging areas in measurement data analysis systems can create technical holes that malicious actors can exploit. These challenges may lead to failures to identify inaccurate and/or fraudulent measurement data, such as those resulting from technical and/or non-technical losses, respectively. For example, measurement data analysis systems may be incapable of generating models and/or expected values that can be used to validate measurement data in near real-time. In another example, measurement data analysis systems may have a limited ability evaluate data to derive characteristics of a measurement device and/or components connected thereto, such as an electric motor connected to an electrical meter measurement device. Adding further complexity, the measurement device may reside at an unsecure location, providing adverse parties with access thereto. With unrestricted access to the measurement device, adverse parties have amble opportunity to compromise the measurement data provided to measurement data analysis systems. For example, a measurement device, such as a water meter, may be located at the residence of an adverse party, providing the adverse party the opportunity to hack the measurement device. In such examples, the adverse party may be able to compromise the measurement device such that it provides inaccurate data with non-technical losses. These and other factors may result in measurement data analysis systems with poor performance and limited capabilities. Such limitations can drastically reduce the usability and applicability of the measurement data analysis systems, contributing to lost revenues and inefficient systems with limited flexibility.

Various embodiments described herein include a measurement data analysis system that can evaluate and/or validate measurement data in multiple stages to identify technical and non-technical losses in near real-time. In various such embodiments, the identification of technical and non-technical losses in near real-time in this manner may be simultaneously performed across large numbers of measurement devices. In one or more embodiments, the multi-stage measurement data analysis (MMDA) may compare measurement data received separately via different communication paths to at least partially validate the measurement data. For example, this may enable identification of a compromised or hacked communication path, a non-technical loss. In some embodiments, the MMDA system may compare measurement data to models or expected values to at least partially validate the measurement data. For instance, this may enable identification of a malfunctioning measurement, a technical loss. In many embodiments, the MMDA system may evaluate measurement data with one or more of machine learning algorithms, models, and values to provide characterizations of measurement device users, such as by generating load, demand, or usage profiles. In several embodiments, the validation and/or evaluation of measurement data may be used to provide valuable and timely information to minimize loss and improve efficiency. In some embodiments, measurement data may be transformed from the time to frequency domain for evaluation. For instance, clustering may be used to identify large groups of utility customers with similar frequency content in their load usage in near real-time. In such instances, this may enable customer account authentication, such as with respect to commercial vs. residential usage rates). In various embodiments, measurement data may be evaluated and compared to known load cycling patterns, such as for equipment, to identify valuable load characteristics including one or more of type, vintage, performance, reliability, and other relevant factors.

In these and other ways the MMDA system may enable the extraction of meaningful, accurate, dynamic, actionable, and customizable information from measurement data in a quick, efficient, and on demand manner, resulting in several technical effects and advantages. In various embodiments, the MMDA may be implemented via one or more computing devices, and thereby provide additional and useful functionality to the one or more computing devices, resulting in more capable and better functioning computing devices. For example, the MMDA system may enable a computing device to reduce waste and protect resources in metered networks, such as utility grids, by improving the detection of technical and non-technical losses.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
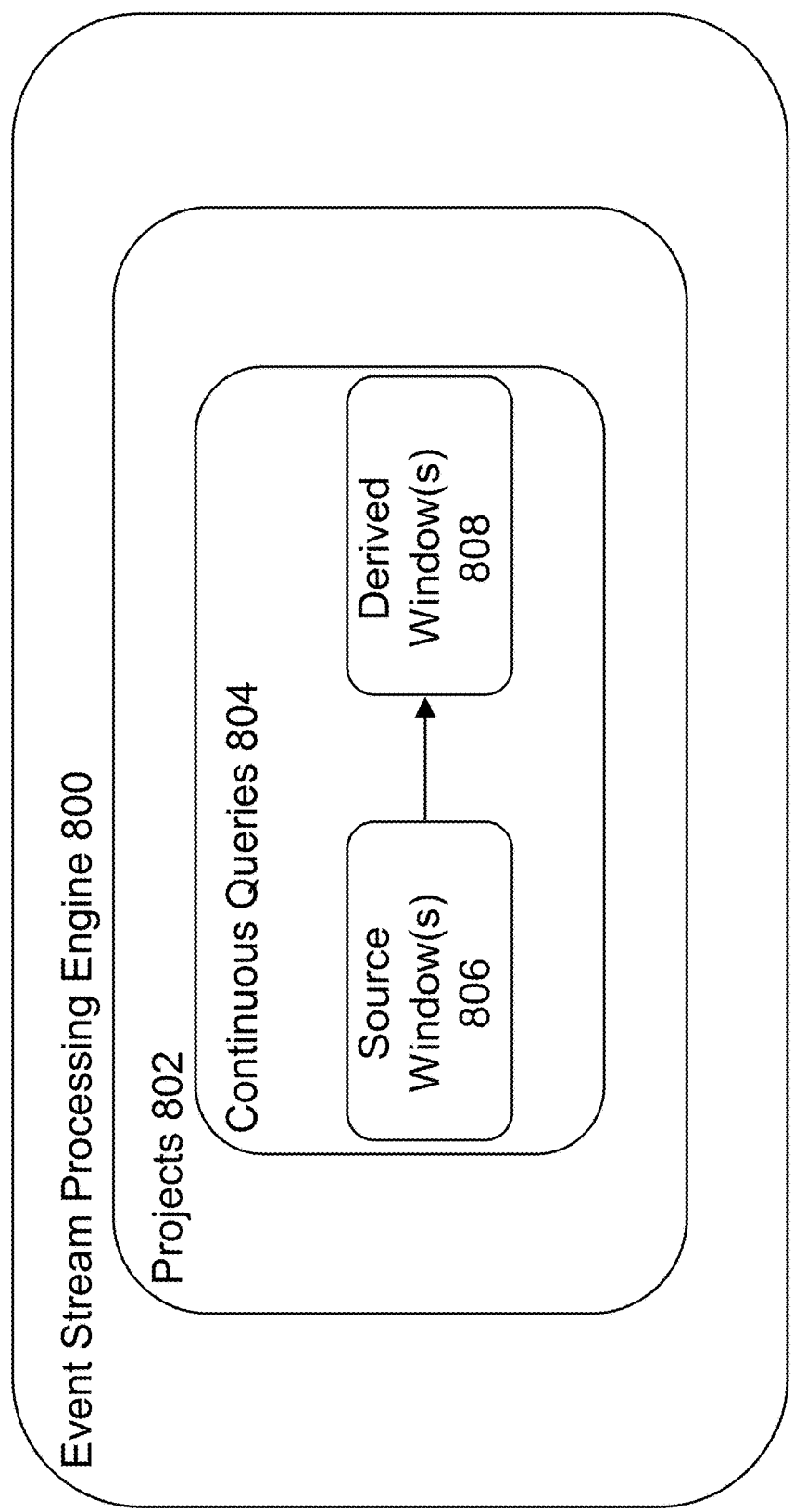
FIG. 8 illustrates a block diagram including components of an Event Stream Processing Engine (ESPE), according to embodiments of the present technology.
Figure 9:
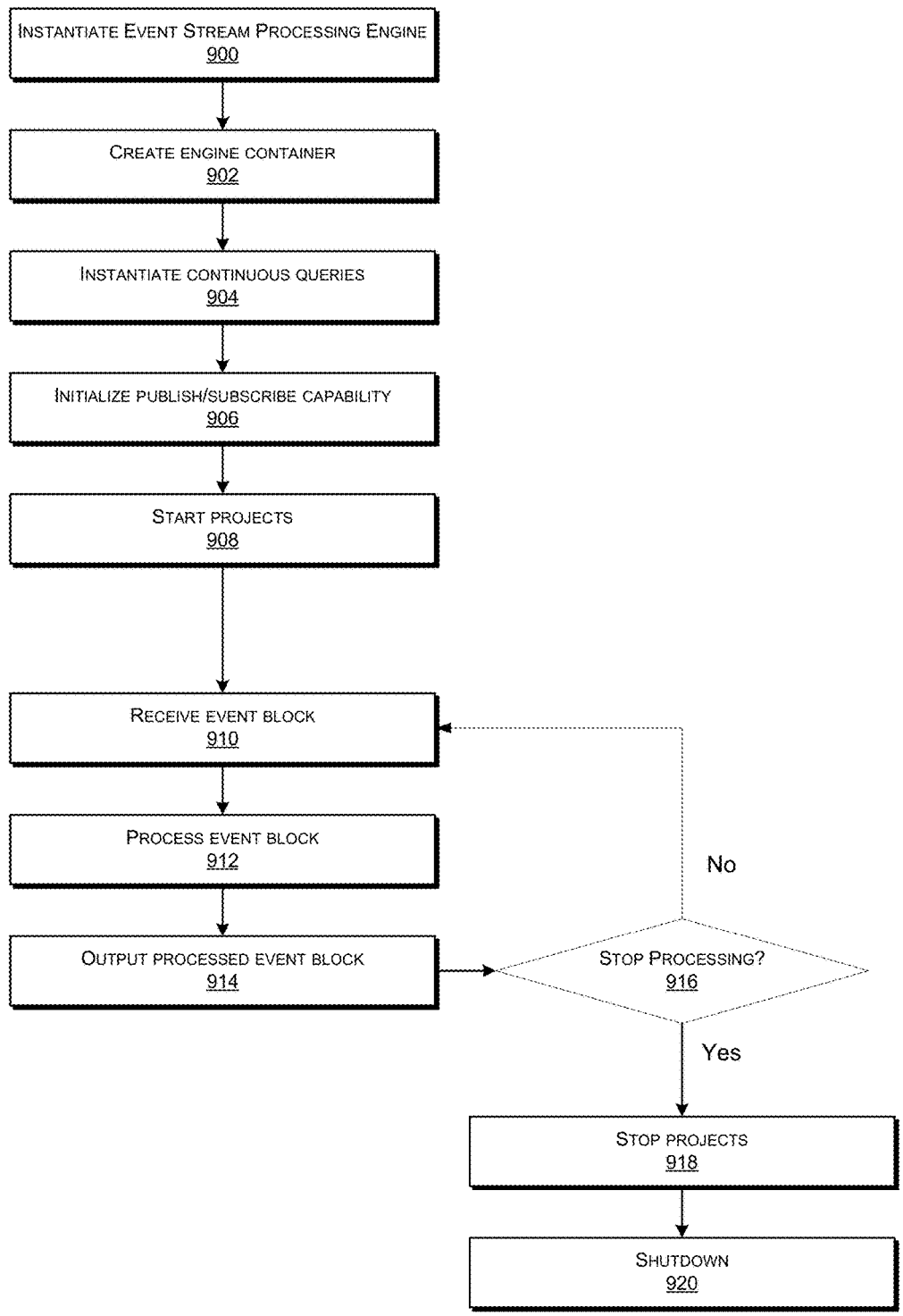
FIG. 9 illustrates a flow chart showing an example process including operations performed by an event stream processing engine, according to some embodiments of the present technology.
Figure 10:
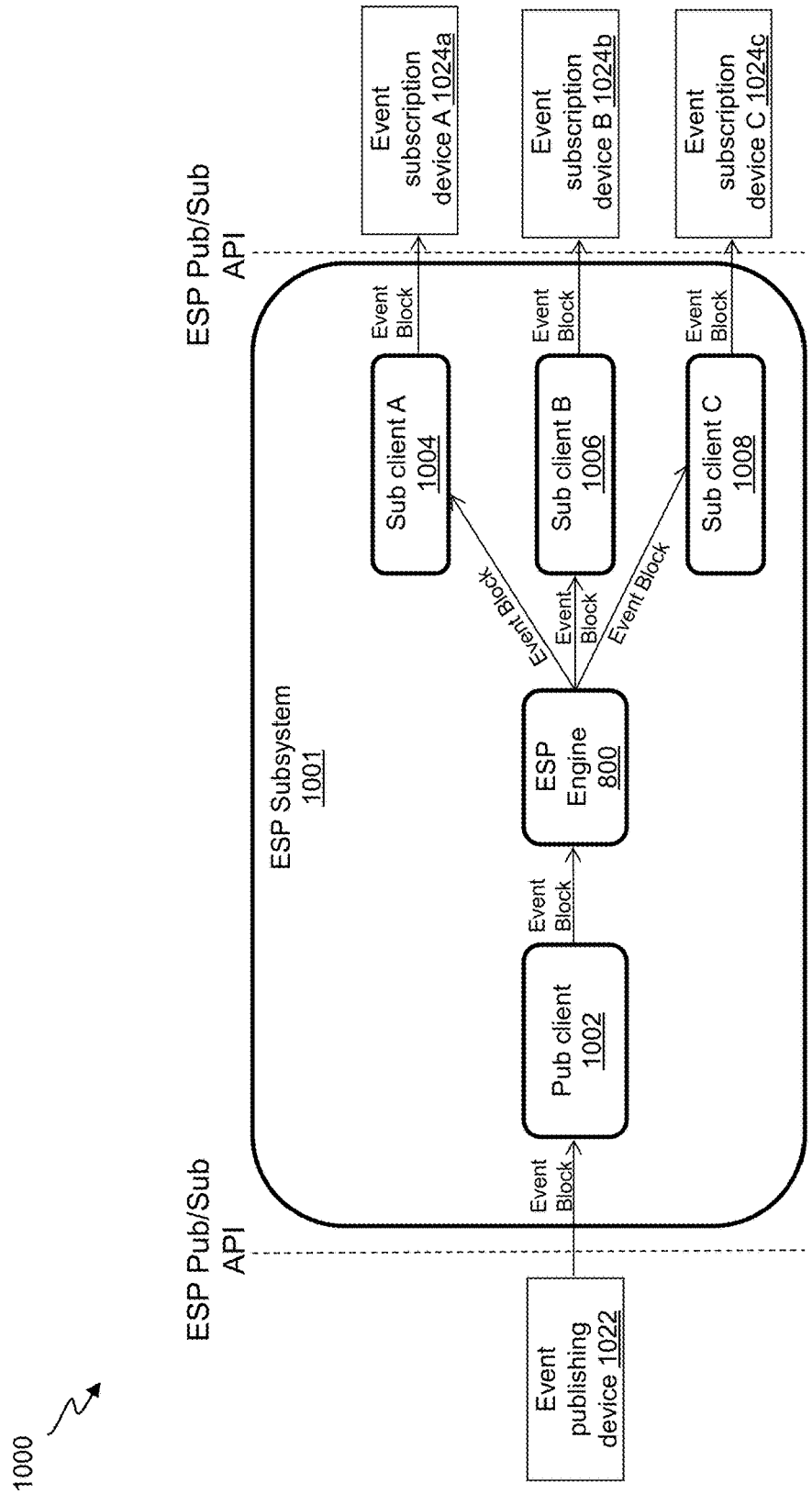
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
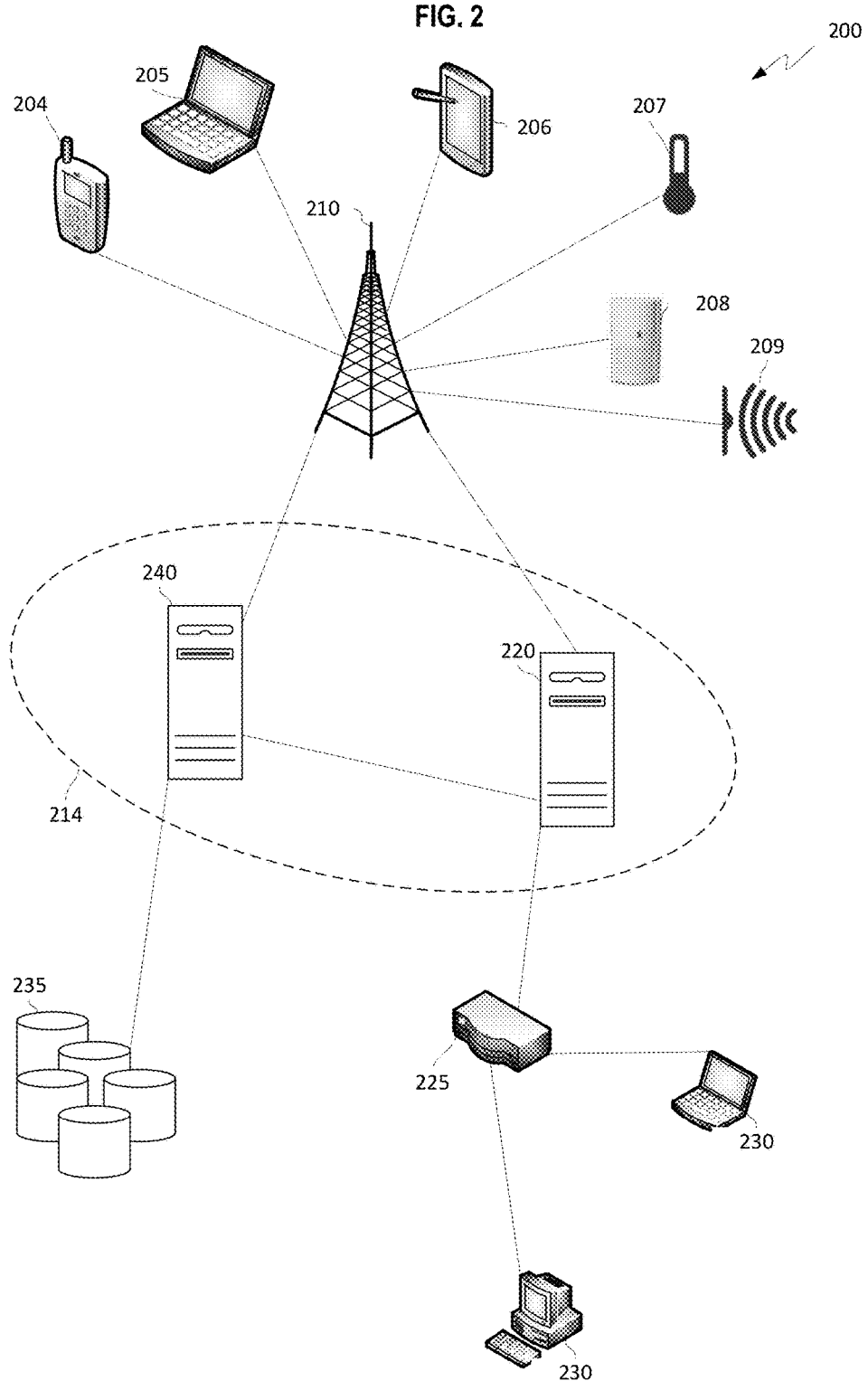
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
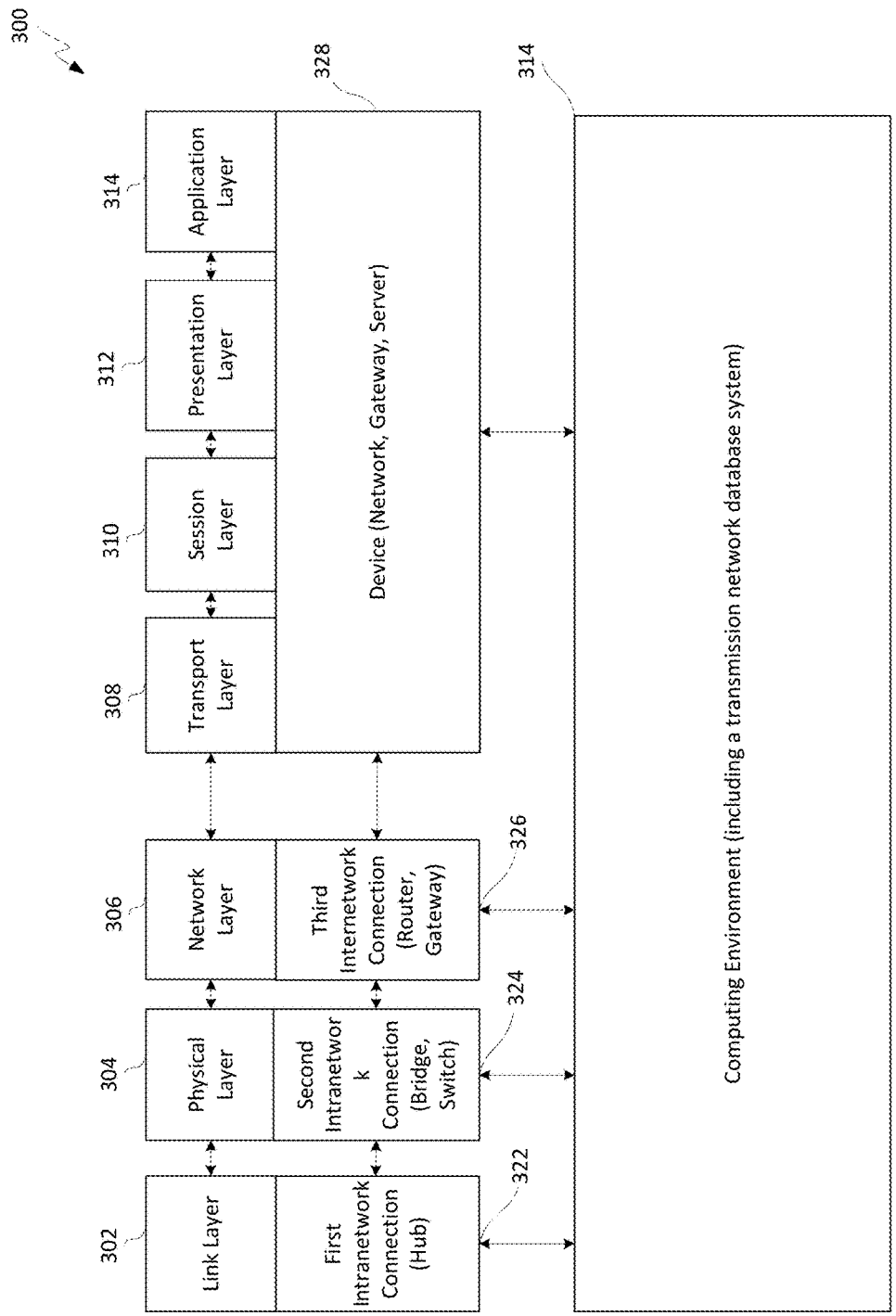
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer.

Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
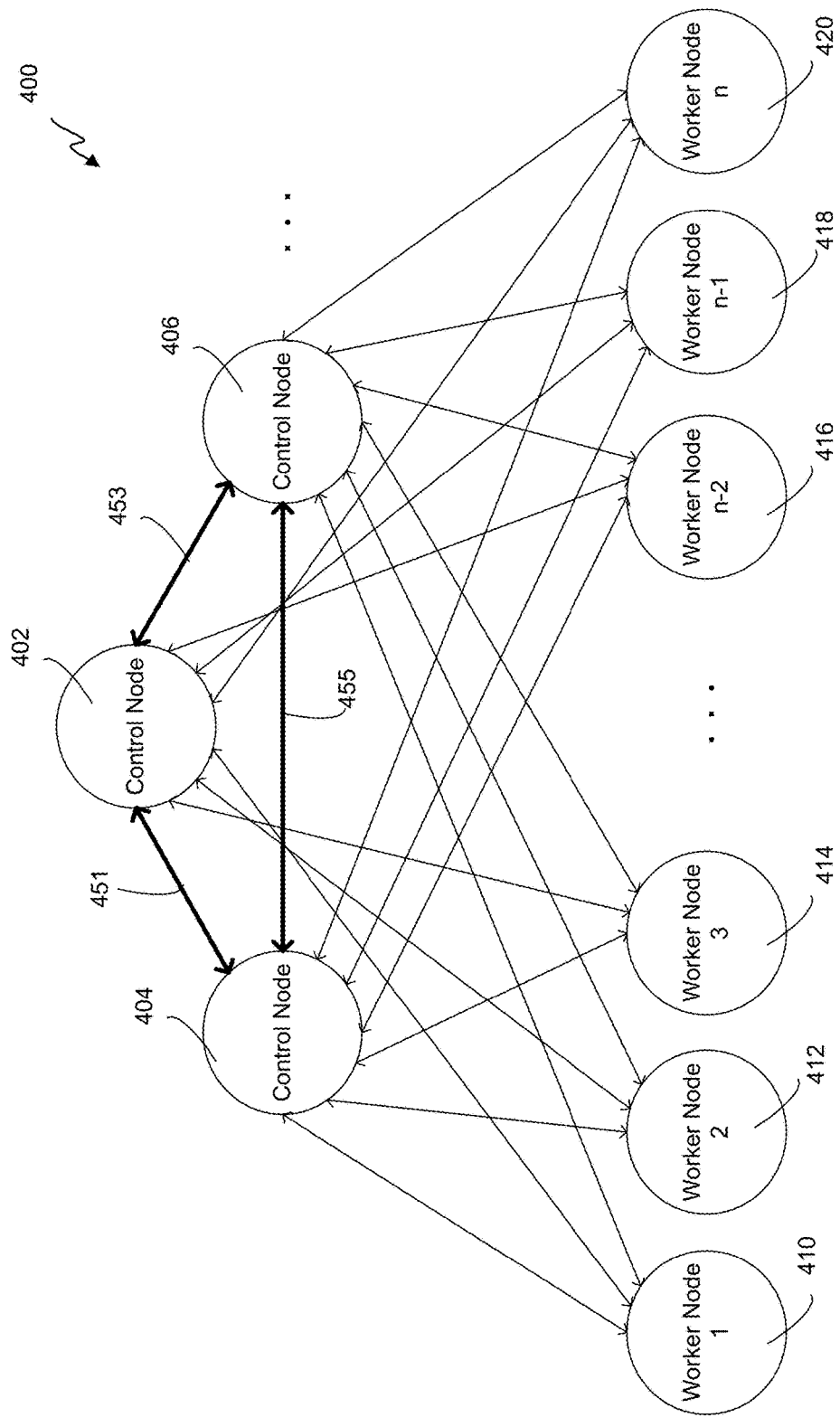
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node, other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
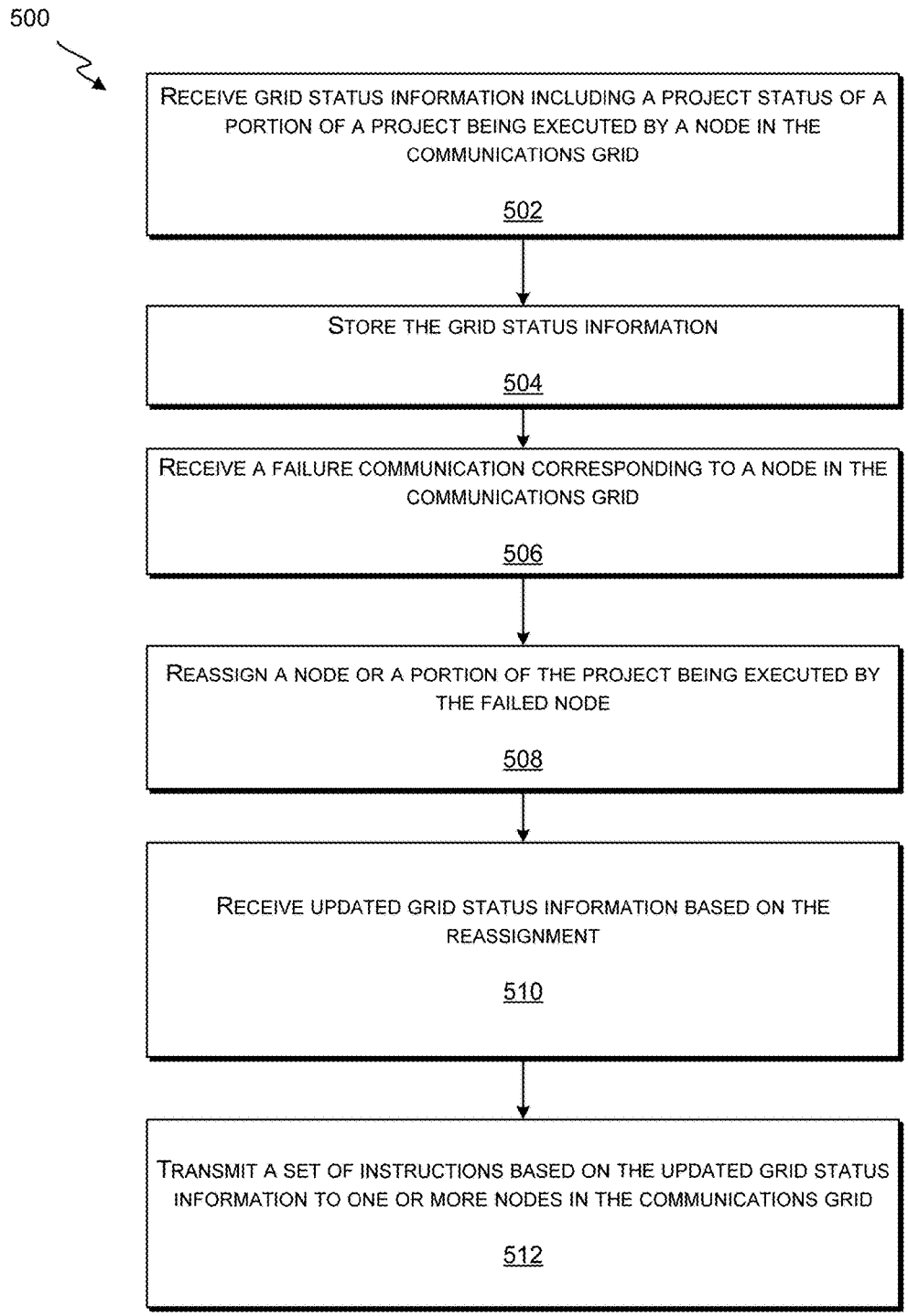
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
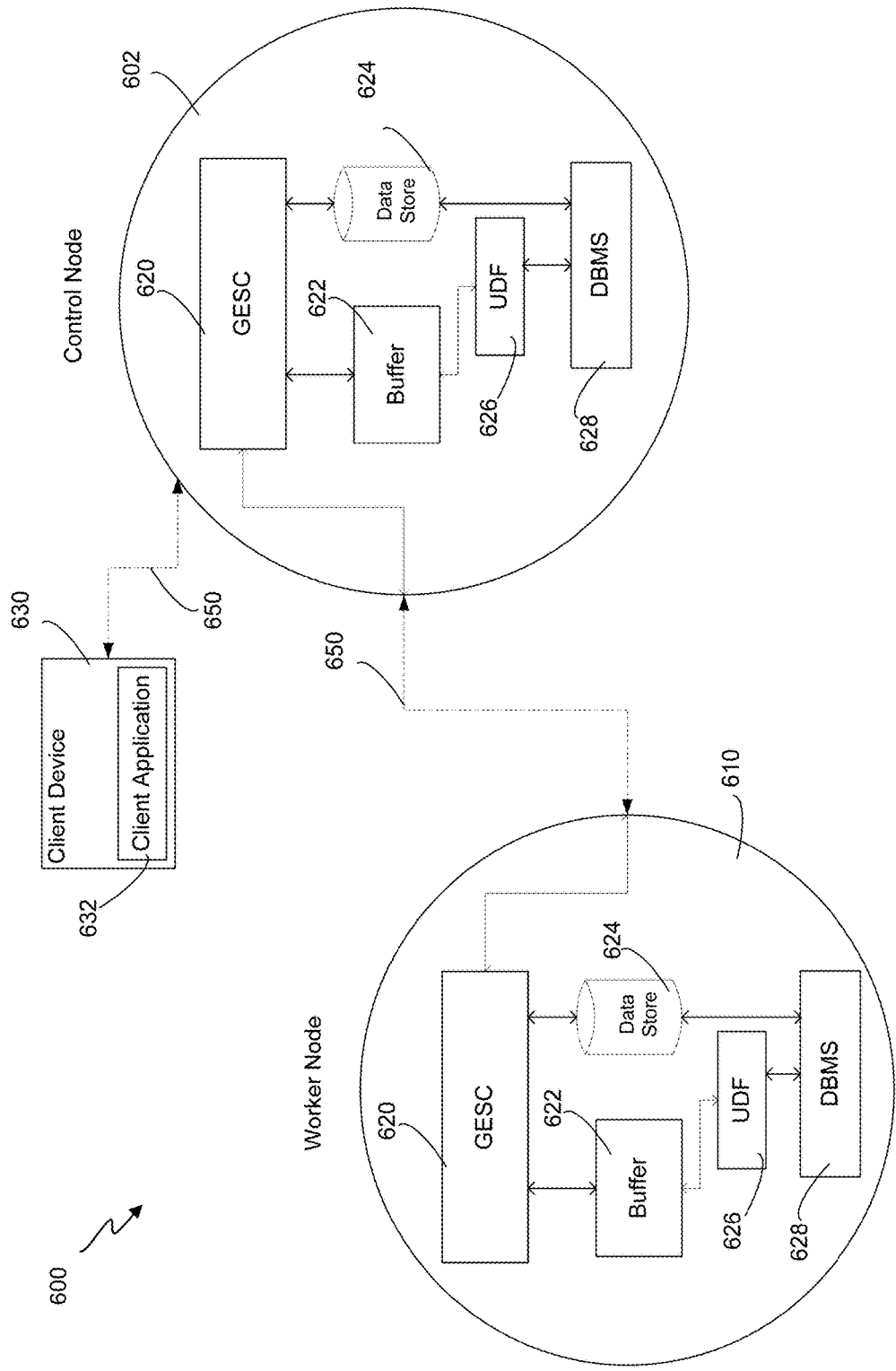
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a node 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
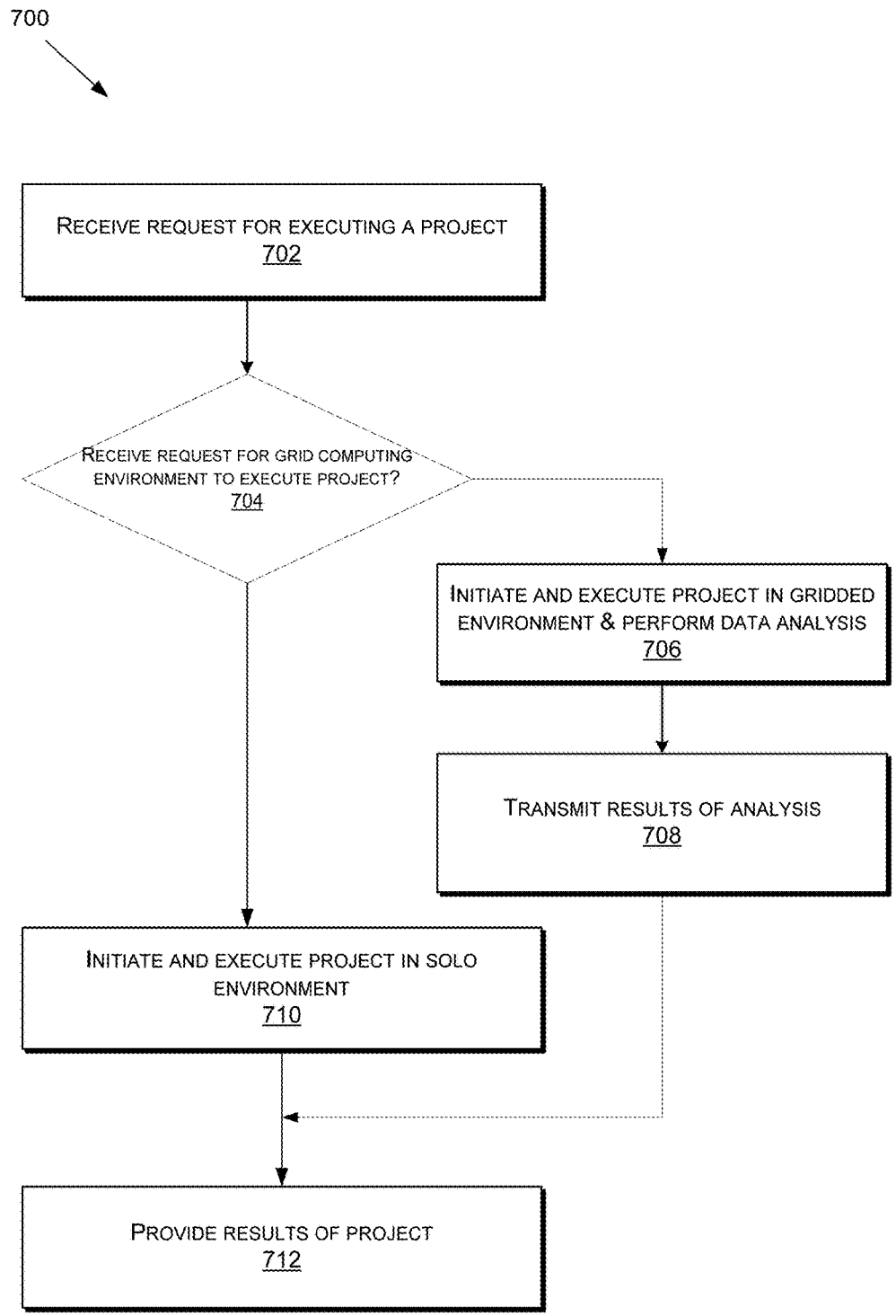
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may be generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11A:
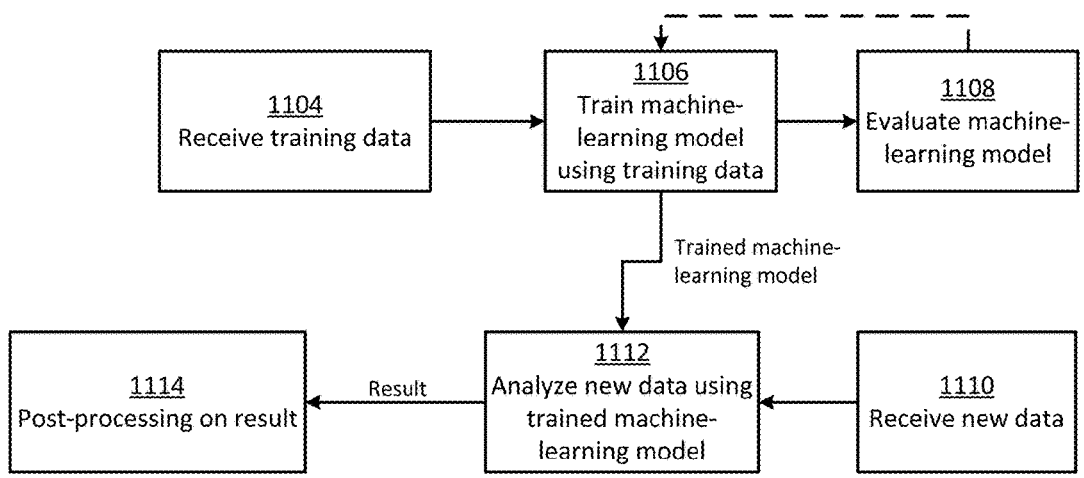
FIG. 11A illustrates a flow chart showing an example process for generating and using a machine-learning model, according to some embodiments of the present technology.

FIG. 11A is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11A.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 11B:
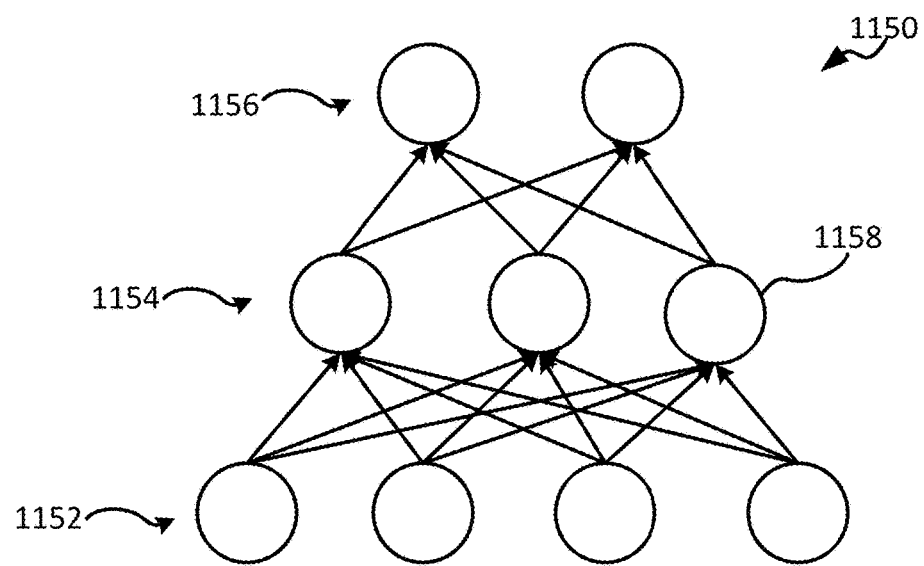
FIG. 11B illustrates a neural network including multiple layers of interconnected neurons, according to some embodiments of the present technology.

A more specific example of a machine-learning model is the neural network 1150 shown in FIG. 11B. The neural network 1150 is represented as multiple layers of interconnected neurons, such as neuron 1158, that can exchange data between one another. The layers include an input layer 1152 for receiving input data, a hidden layer 1154, and an output layer 1156 for providing a result. The hidden layer 1154 is referred to as hidden because it may not be directly observable or have its input directly accessible during the normal functioning of the neural network 1150. Although the neural network 1150 is shown as having a specific number of layers and neurons for exemplary purposes, the neural network 1150 can have any number and combination of layers, and each layer can have any number and combination of neurons.

The neurons and connections between the neurons can have numeric weights, which can be tuned during training. For example, training data can be provided to the input layer 1152 of the neural network 1150, and the neural network 1150 can use the training data to tune one or more numeric weights of the neural network 1150. In some examples, the neural network 1150 can be trained using backpropagation. Backpropagation can include determining a gradient of a particular numeric weight based on a difference between an actual output of the neural network 1150 and a desired output of the neural network 1150. Based on the gradient, one or more numeric weights of the neural network 1150 can be updated to reduce the difference, thereby increasing the accuracy of the neural network 1150. This process can be repeated multiple times to train the neural network 1150. For example, this process can be repeated hundreds or thousands of times to train the neural network 1150.

In some examples, the neural network 1150 is a feed-forward neural network. In a feed-forward neural network, every neuron only propagates an output value to a subsequent layer of the neural network 1150. For example, data may only move one direction (forward) from one neuron to the next neuron in a feed-forward neural network.

In other examples, the neural network 1150 is a recurrent neural network. A recurrent neural network can include one or more feedback loops, allowing data to propagate in both forward and backward through the neural network 1150. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1150 operates by receiving a vector of numbers from one layer; transforming the vector of numbers into a new vector of numbers using a matrix of numeric weights, a nonlinearity, or both; and providing the new vector of numbers to a subsequent layer of the neural network 1150. Each subsequent layer of the neural network 1150 can repeat this process until the neural network 1150 outputs a final result at the output layer 1156. For example, the neural network 1150 can receive a vector of numbers as an input at the input layer 1152. The neural network 1150 can multiply the vector of numbers by a matrix of numeric weights to determine a weighted vector. The matrix of numeric weights can be tuned during the training of the neural network 1150. The neural network 1150 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1154, of the neural network 1150. The subsequent layer of the neural network 1150 can receive the transformed output, multiply the transformed output by a matrix of numeric weights and a nonlinearity, and provide the result to yet another layer of the neural network 1150. This process continues until the neural network 1150 outputs a final result at the output layer 1156.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

According to embodiments discussed herein, the above-described computing devices and systems may be utilized to evaluate and/or validate measurement data. The evaluation and/or validations of measurement data described herein may be used to reduce waste and protected resources in metered networks, such as utility grids, resulting in a computing device and/or system with exclusive and advantageous capabilities. For example, measurement data may be evaluated and compared to known load cycling patterns for equipment to identify unreliable, faulty, or failed equipment. In another example, malfunctioning or hacked measurement devices may be identified by comparing measurement data received from a measurement device via two or more separate communication paths.

In these and other ways the MMDA system may enable the extraction of meaningful, accurate, dynamic, actionable, and customizable information from measurement data in a quick, efficient, and on demand manner, resulting in several technical effects and advantages. In various embodiments, the MMDA may be implemented via one or more computing devices, and thereby provide additional and useful functionality to the one or more computing devices, resulting in more capable and better functioning computing devices. For example, the MMDA system may enable a computing device to reduce waste and protect resources in utility grids.

In another example, measurement device hacking may be thwarted by comparing measurement data received from a measurement device via multiple separate communication paths. These and other features of the MMDA system described herein may enable a computing device and/or system implementing it to realize unique and advantageous functionalities, resulting in an improved computer.

Figure 12A:
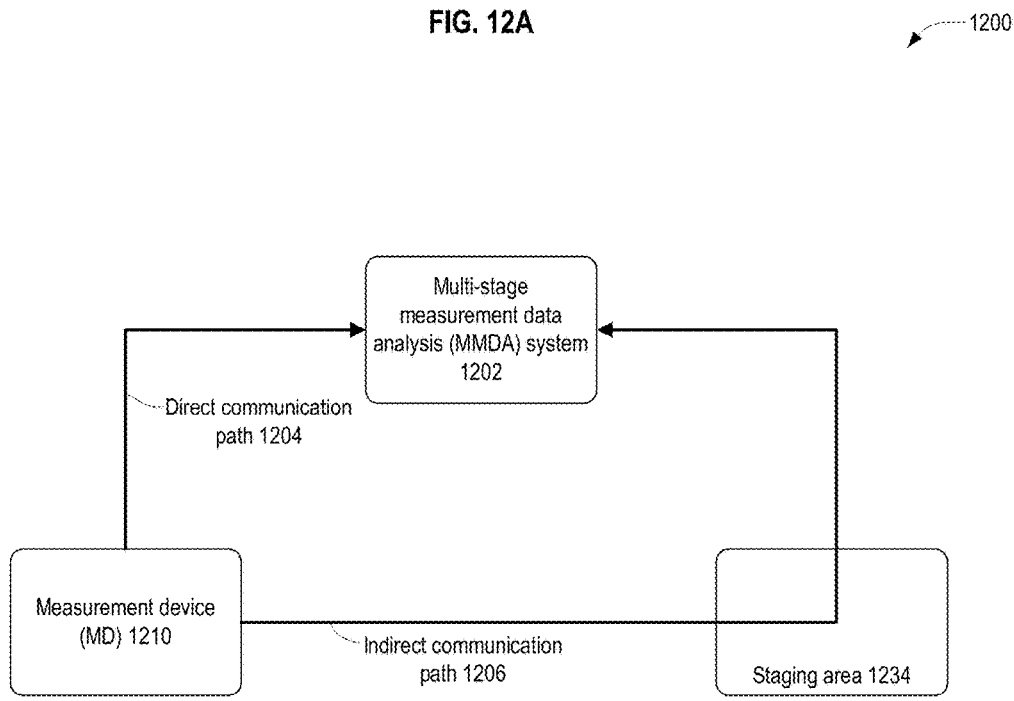
FIGS. 12A and 12B illustrate an exemplary operating environment for a multi-stage measurement data analysis (MMDA) system, according to some embodiments of the present technology.
Figure 12B:
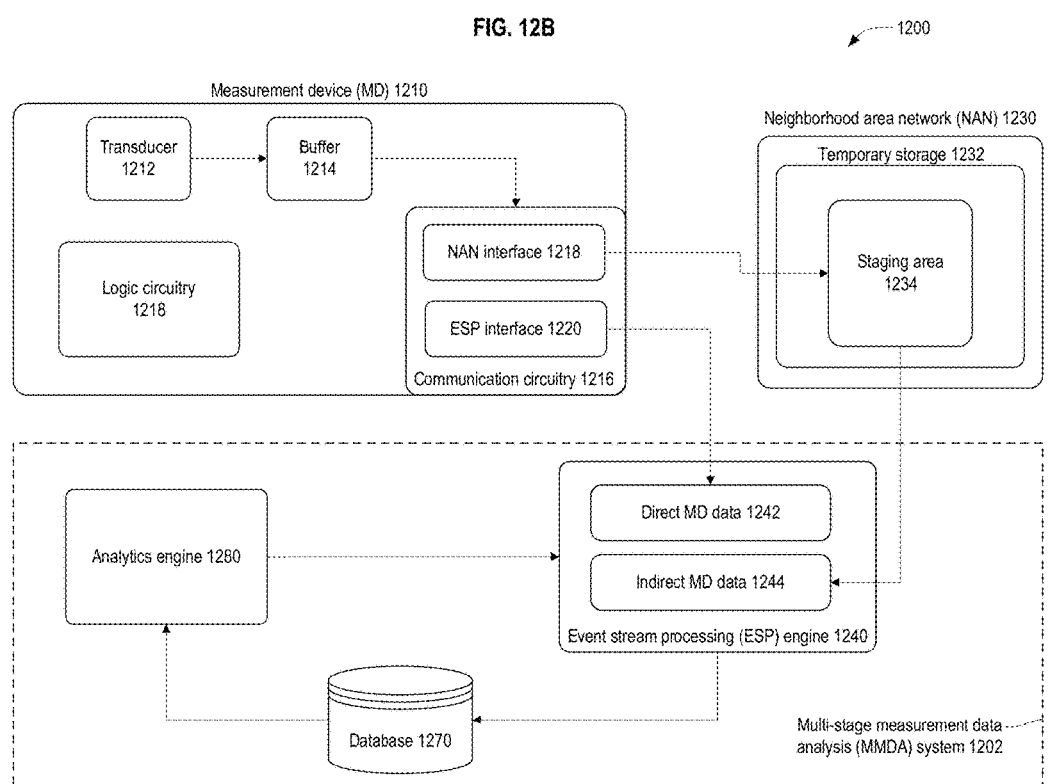

FIGS. 12A and 12B illustrate an exemplary operating environment 1200 that may be representative of various embodiments. Referring to FIG. 12A, operating environment 1200 may include a multi-stage measurement data analysis (MMDA) system 1202, a measurement device (MD) 1210, and a staging area 1234. In various embodiments, MMDA system 1202 may receive first measurement data (also referred to as measurement device data) via a direct communication path 1204 and second measurement data via an indirect communication path 1206. In various such embodiments, measurement data received via the indirect communication path 1206 may be collected in a staging area 1234 prior to being communicated to MMDA system 1202. In one or more embodiments described herein, MMDA system 102 may evaluate and/or validate measurement data received from MD 1210 in near real-time. In some embodiments, MMDA system 1202 may validate measurement data received via the indirect communication path 1206, at least in part, by comparing it to measurement data received via the direct communication path 1204, or vice-versa. In many embodiments, MMDA system 1202 may generate one or more models and/or predicted values, such as based on historical measurement data, to evaluate and/or validate measurement data received from MD 1210. In many such embodiments, the one or more models and/or predicted values may be utilized by the MMDA system 1202 to evaluate and/or validate measurement data received from MD 1210 in near real-time. Embodiments are not limited in this context.

As used herein, the direct communication path 1204 may refer to a communication path in which data from the MD 1210 is not aggregated with data from other MDs prior to being received by the MMDA system 1202 and the indirect communication path 1206 may refer to a communication path in which data from the MD 1210 is aggregated with data from other MDs prior to being received by the MMDA system 1202. For example, when data is sent from MD 1210 to MMDA system 1202 via direct communication path 1204, the data may be received without being aggregated with data from other measurement devices. However, data when data is sent from MD 1210 to MMDA system 1202 via indirect communication path, the data may be received after being aggregated with data from other measurement devices (See e.g., FIGS. 13A and 13B). As such, both direct and indirect communication paths 1204, 1206 may utilize one or more pieces of communication infrastructure (e.g., switches, relays, routers, etc.) to communicate data along the respective communication path.

Referring to FIG. 12B, MMDA system 1202 may include one or more of an event stream processing (ESP) engine 1240, a database 1270, and an analytics engine 1280; MD 1210 may include one or more of a transducer 1212, a buffer 1214, communication circuitry 1216, and logic circuitry 1218; and NAN 1230 may include temporary storage 1232 with staging area 1234. In some embodiments, ESP engine 1240 may be the same or similar to one or more other ESP engines described herein, such as ESP engine 800 of FIG. 8. In various embodiments described herein, MMDA system 1202 may validate direct MD data 1242 and/or indirect MD data 1244 received from MD 1210 with one or more models, algorithms, or values generated by analytics engine 1280. In various such embodiments, the one or more models, algorithms, or values may be uploaded to ESP engine 1240 for application to MD data in near real-time, such as for the detection of losses in measurement data. As used herein, near real-time may refer to within less than a minute up to within a day of real-time. In some embodiments, analytics engine 1280 may generate the one or more models, algorithms, or values based on various techniques include machine learning and frequency analysis, such as by using historical measurement data in database 1270 (see e.g., FIG. 14).

In many embodiments, initially, transducer 1212 of MD 1210 may measure some quantity, such as power usage, and convert it into digital data that is stored in buffer 1214 as buffer data. In many such embodiments, the buffer data may be periodically communicated or streamed to ESP engine 1240 via ESP interface 1220 and to staging area 1234 via NAN interface 1218. In several embodiments, the NAN interface may communicatively couple directly with the NAN 1230. In some embodiments, NAN interface 1218 and ESP interface 1220 may utilize overlapping and/or separate portions of communication circuitry 1216. For instance, ESP interface 1220 may utilize a cellular network and NAN interface 1218 may utilize a wireless sensor network. In another instance, ESP interface 1220 and NAN interface 1218 may utilize a common wireless local area network (WLAN). In one or more embodiments, the NAN interface may communicatively couple with a neighborhood area network (NAN).

In various embodiments, the buffer data sent via the ESP interface 1220 may be received as direct MD data 1242 at ESP engine 1240. In some embodiments, the values received as direct MD data 1242 may include or be referred to as measured values. In several embodiments, the staging area 1234 may collect buffer data from one or more other measurement devices, as will be described in more detail below, such as with respect to FIGS. 13A-13B. From the staging area 1234, in many embodiments, the buffer data may be received as indirect MD data 1244 at ESP engine 1240. In some embodiments, the values received as indirect MD data 1244 may include or be referred to as reported values.

In several embodiments, ESP engine 1240 may compare corresponding measured values in direct MD data 1242 and reported values in indirect MD data 1242 to detect losses in measurement data. In one or more embodiments, ESP engine 1240 may validate direct MD data 1242 and/or indirect MD data 1244 with one or more models, algorithms, or values generated by analytics engine 1280. In one or more such embodiments, the one or more models, algorithms, or values may be applied to direct MD data 1242 and/or indirect MD data 1244 in near real-time to detect losses in measurement data. In some embodiments, analytics engine 1280 may generate the one or more models, algorithms, or values and upload them to ESP engine 1202 for deployment. In many embodiments, losses may include technical losses and non-technical losses. In several embodiments, technical losses may include or refer to resources or revenue loss due to equipment malfunction, leakage, impedance, heating, and the like. In many embodiments, non-technical loss may refer to resources or revenue loss due to incorrect billing, theft, incorrect installation.

Figure 13A:
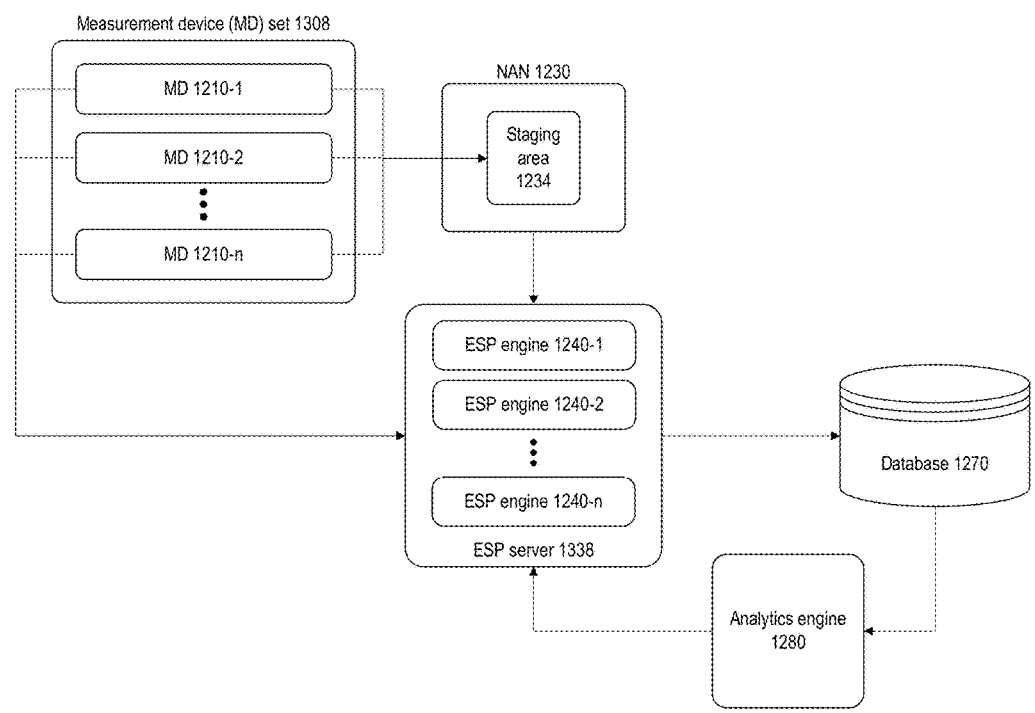
FIGS. 13A and 13B illustrate exemplary processing flows of a MMDA system, according to some embodiments of the present technology.
Figure 13B:
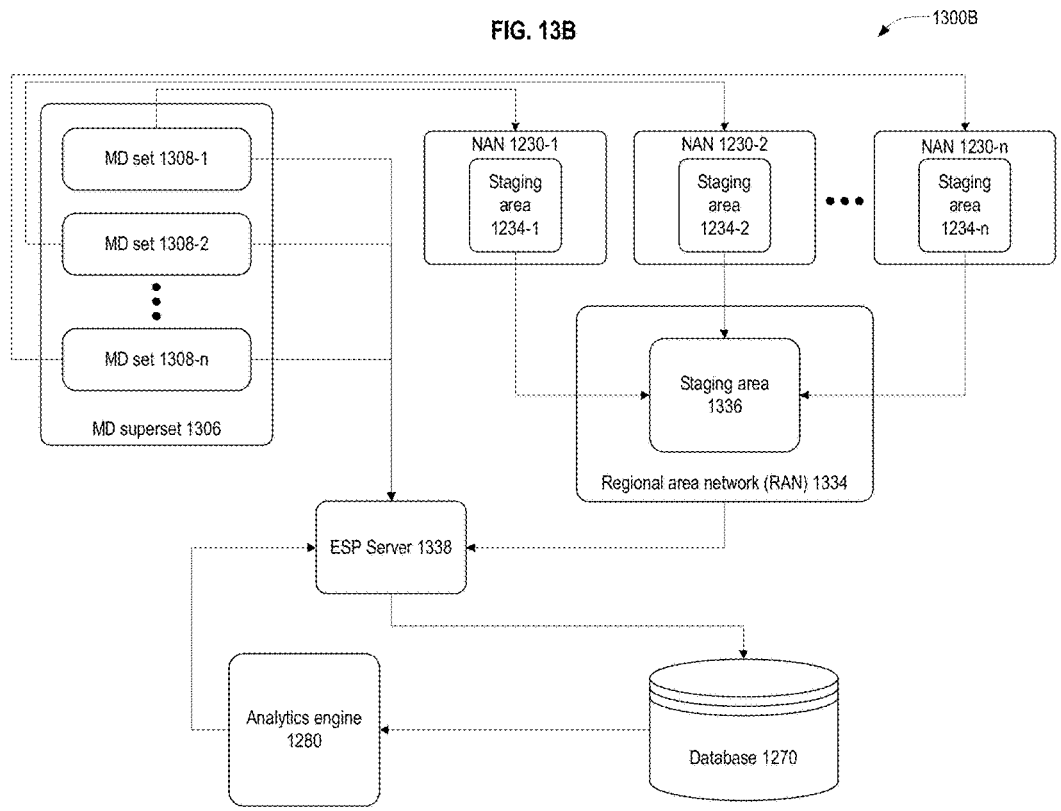

FIGS. 13A and 13B illustrate exemplary processing flows 1300A, 1300B that may be representative of various embodiments. In processing flow 1300A, each of one or more MDs 1210-1, 1210-2, 1210-n in a measurement device (MD) set 1308 may provide measurement data via indirect and direct communication paths to one or more ESP engines implemented on ESP server 1338 for evaluation and/or validation of measurement data in near real-time. In various embodiments, as illustrated by processing flow 1300A, measurement data from each MD in MD set 1308 traversing the indirect communication path (see e.g., FIG. 12A) may be collected in staging area 1234 in NAN 1230 prior to being received by ESP server 1338. In processing flow 1300B, each measurement device in one or more MD sets 1308-1, 1308-2, 1308-n included in an MD superset 1306 may provide measurement data via indirect and direct communication paths to one or more ESP engines implemented on ESP server 1338. In some embodiments, as illustrated by processing flow 1300B, measurement data from each MD set 1308-1, 1308-2, 1308-n in MD superset 1306 traversing the indirect communication path (see e.g., FIG. 12A) may be collected in respective NANs 1230-1, 1230-2, 1230-n, and then further collected in staging area 1336 of a regional area network (RAN) 1334 prior to being received by ESP server 1338. Embodiments are not limited in this context.

Figure 14:
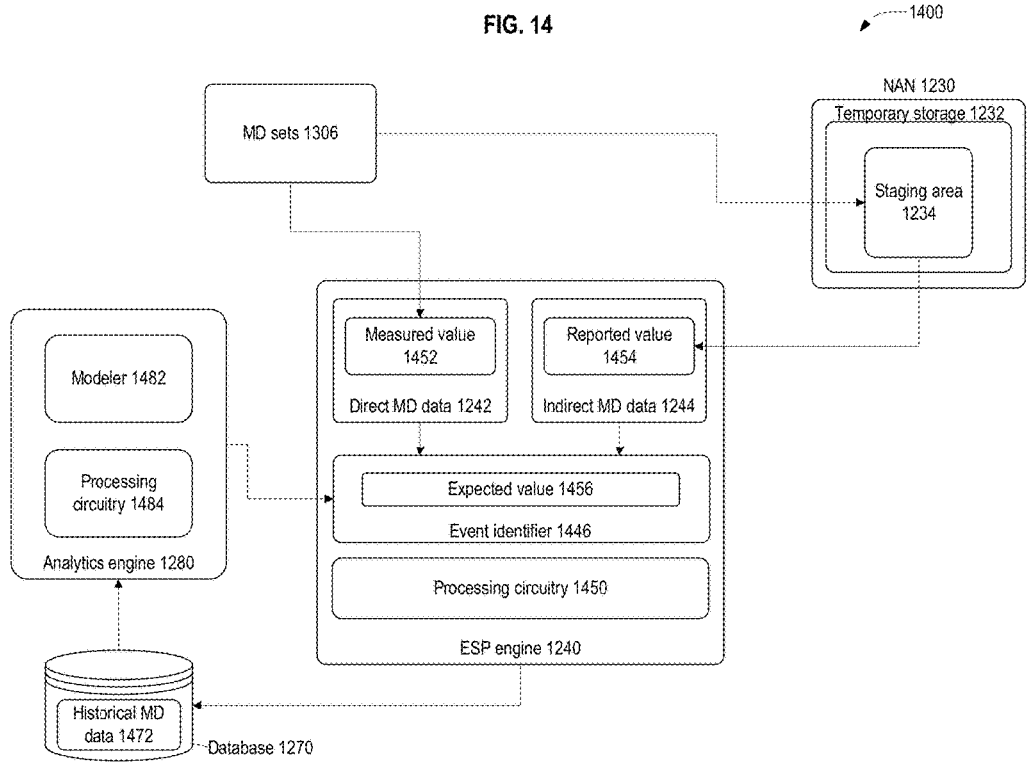
FIG. 14 illustrates another exemplary processing flow of a MMDA system, according to some embodiments of the present technology.

FIG. 14 illustrates exemplary processing flow 1400 that may be representative of various embodiments. In processing flow 1400, representative measurement data from a representative MD in MD sets 1306 is provided to ESP engine 1240 via direct and indirect communication paths (see e.g., FIG. 12A). In one or more embodiments, the indirect communication path passes through staging area 1234 in temporary storage 1232 within NAN 1230. In the illustrated embodiment, data received via the direct communication path, or direct MD data 1242, may include a measured value 1452 while data received via the indirect communication path, or indirect MD data 1244, may include a reported value 1454. In various embodiments, one or more of the measured value 1452 and the reported value 1454 may be compared to an expected value 1456 by an event identifier 1446 in ESP engine 1240 to at least partially validate the measurement data. In several embodiments, the event identifier 1446 may compare the measured value 1452 to the reported value 1454 to at least partially validate the measurement data. In one or more embodiments described herein, measurement data may be validated upon the reported value 1454 matching the measured value 1452 with a first margin of error and the reported value 1454 matching the expected value 1456 within a second margin of error. In one or more such embodiments, the first and second margins of errors may be selectable. In various embodiments, after evaluation by ESP engine 1240 measured value 1452, reported value, and/or expected value may be stored in database 1270 as historical MD data 1472. In many embodiments, the expected value may be generated or received from analytics engine 1280, such as based on a model, algorithm, or value produced by modeler 1482 using historical MD data 1472. Embodiments are not limited in this context.

In various embodiments described herein, MMDA system 1202 may validate direct MD data 1242 and/or indirect MD data 1244 received from MD 1210 with one or more models, algorithms, or values generated by analytics engine 1280. In various such embodiments, the one or more models, algorithms, or values may be uploaded to ESP engine 1240 for application to MD data in near real-time, such as for the detection of losses in measurement data. In some embodiments, analytics engine 1280 may generate the one or more models, algorithms, or values based on various techniques include machine learning and frequency analysis, such as by using historical measurement data 1472 in database 1270.

In several embodiments, ESP engine 1240 may compare corresponding measured values (e.g., measured value 1452) in direct MD data 1242 and reported values (e.g., reported value 1454) in indirect MD data 1242 to detect losses in measurement data. In one or more embodiments, ESP engine 1240 may validate direct MD data 1242 and/or indirect MD data 1244 with one or more models, algorithms, or values generated by analytics engine 1280. In one or more such embodiments, the one or more models, algorithms, or values may have previously been uploaded/deployed to/on ESP engine 1240 for application to direct MD data 1242 and/or indirect MD data 1244 in near real-time to detect losses in measurement data.

In various embodiments, at least partial validation of one or more of the measured value 1452 and the reported value 1454 may be determined based on event identifier 1446 comparing be compared to an expected value 1456. In many embodiments, at least partial validation of one or more of the measure value 1452 and the reported value 1454 may be determined based on the event identifier 1446 comparing the measured value 1452 to the reported value 1454. In some embodiments, measurement data may be validated upon the reported value 1454 matching the measured value 1452 with a first margin of error and the reported value 1454 matching the expected value 1456 within a second margin of error. In one or more such embodiments, the first and second margins of errors may be selectable.

In various embodiments, after evaluation by ESP engine 1240 measured value 1452, reported value, and/or expected value may be stored in data base 1270 as historical MD data 1472. In many embodiments, the expected value may be generated or received from analytics engine 1280, such as based on a model, algorithm, or value produced by modeler 1482 using historical MD data 1472. In various embodiments, ESP 1240 may generate customizable notices, flags, and alerts, reminders, and the like based on evaluation and/or validation. In many embodiments, metadata may be stored with historical MD data 1472. In many such embodiments, the metadata may include data regarding evaluations and/or validation of the associated value. In some embodiments, any features or combinations thereof described herein may be fully customizable.

In various embodiments, one or more corrective processes may be determined based on one or more characteristics of an identified loss, such as technical or non-technical loss. For instance, when technical loss is identified a component may be identified for maintenance and/or replacement. In another instance, when non-technical loss is identified, the corresponding measuring device may be reclassified, flagged for further analysis/investigation, and/or identified as compromised.

Figure 15A:
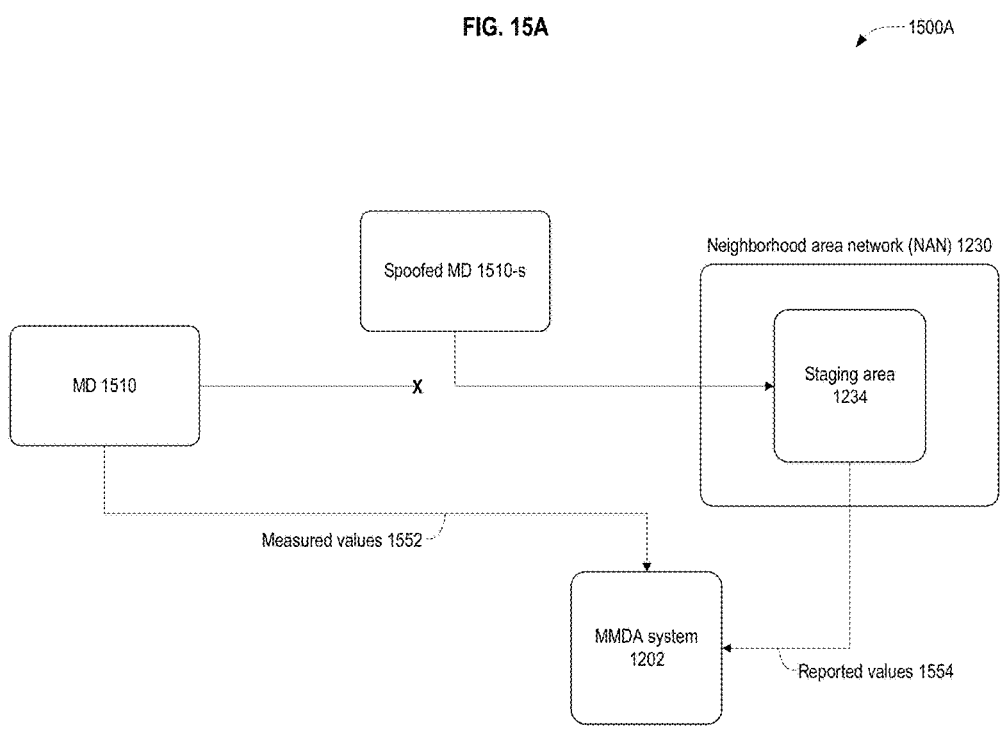
Figure 15C:
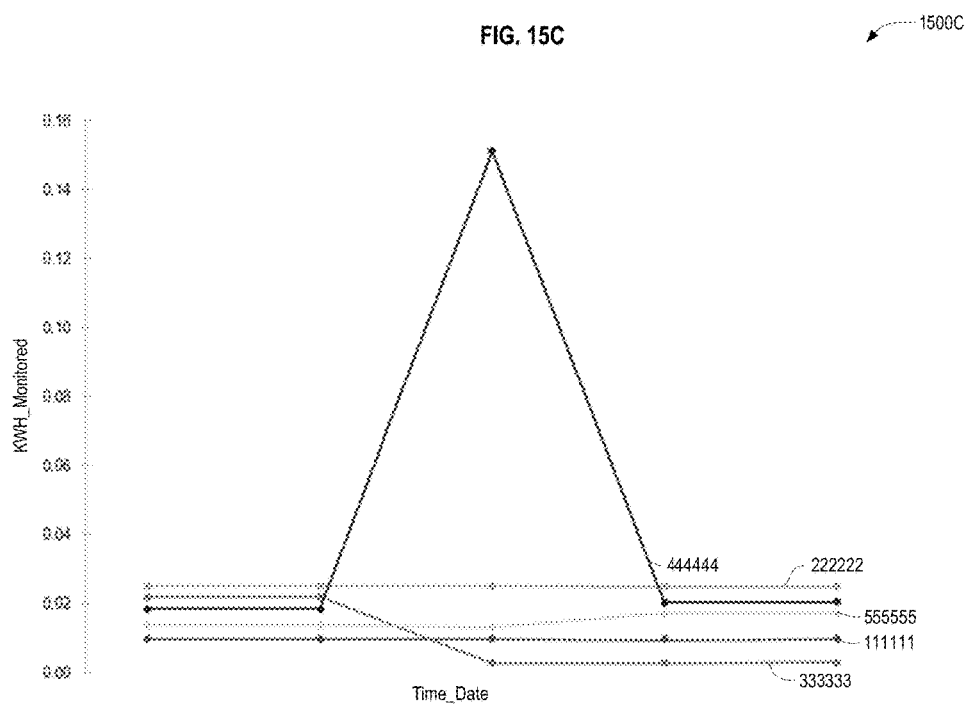

FIGS. 15A-15C illustrate a first example of measurement data analysis, according to some embodiments of the present technology. In one or more embodiments described herein, FIGS. 15A-15C may illustrate an example of detecting a non-technical loss. For instance, in the illustrated embodiment of FIG. 15A, MD 1510 may provide measured values 1552 to MMDA system 1202 and spoofed MD 1510-*s* may provide reported values 1554 to MMDA system 1202 via staging area 1234. In many embodiments, spoofed MD 1510-*s* may be the result of malicious actors. For example, MD 1510 may be compromised and/or blocked such that staging area 1234 associates data received from spoofed MD 1510-*s* as data being received from MD 1510. Embodiments are not limited in this context.

In the illustrated embodiment, MD 1510 may include an electrical meter that streams data to MMDA system 1202. Further, malicious actors may have gained access to encryption codes located within MD 1510. Accordingly, in various embodiments, the malicious users can manipulate these encryption codes to report a different level of electricity consumption to the staging area 1234 of NAN 1230 (e.g., via spoofed MD 1510-*a*) than what is actually collected by MD 1510. However, due to changes in an average household's electricity consumption (e.g., seasonal, monthly, day of week, etc.), the malicious users must periodically access the encryption codes and alter the electricity consumption being reported to the staging area 1234 in order to maintain anonymity via a realistic level of electricity consumption. Accordingly, MMDA system 1202 may compare measured values 1552 (KWH_Monitored in FIG. 15B) and reported values (KWH in FIG. 15B) to detect this non-technical loss. In many embodiments, KWH may stand for kilowatt-hours).

As previously discussed, the MMDA system 1202 may receive data streams from a number of different MDs that are the same or similar to MD 1510. As shown in FIGS. 15B and 15C, in some embodiments, MMDA system 1202 may receive both measured (KWH_Monitored) and reported (KWH) values from meters 111111, 222222, 333333, 444444, 555555 as streams of data. In the illustrated embodiment, meter 444444 may correspond to MD 1510. Accordingly, as the streaming data is consumed, MMDA system 1202 may compare the electricity demand being reported by the NAN (KWH) at the same or similar time as electricity demand is being reported by the individual meter 444444 (i.e., MD 1510). In many embodiments, these values may be compared according to a set of rules to flag any discrepancies in what is being reported by the meter 444444.

In various embodiments, some changes over time are to be expected, such as illustrated with respect to meters 333333, 555555. However, when a change meets a defined threshold, such as one included in the set of rules, a flag may be triggered as illustrated with respect to meter 444444. In many embodiments, one or more of the rules, such as the defined threshold, may be determined based on historical data (e.g., historical MD data 1472). Further, one or more corrective processes may be determined and/or performed in response to the flag. In various embodiments, the MMDA 1202 may provide a geospatial map by which to monitor activity. In various such embodiments, discrepancies may be correlated and/or overlaid on a map comprising the locations of a number of different meters (e.g., meters 111111, 222222, 333333, 444444, 555555).

As shown in the highlighted portion of FIG. 15B, on Jul. 30, 2010 at 4:23 am, there was a notable discrepancy in KWH between what the meter reported to the NAN and what the meter actually collected (0.019 KWH vs. 0.151 KWH_monitored). In various embodiments, this discrepancy may trigger a corresponding Flag-Alert. The discrepancy is also reflected in the chart of FIG. 15C. In several embodiments, a geospatial map may indicate the discrepancy by marking the GPS coordinate of the meter in the geospatial map. In the illustrated example, in response to being flagged, additional monitoring of meter 444444 may be determined as a corrective process. Accordingly, meter 4444444 may be closely monitored over the next several months to detect whether the flag is a result of intentional tampering. For example, if the same discrepancy is identified at the same time each month, intentional tampering may be confirmed. In such examples, in response the evidence of tampering may be provided to the proper authorities and/or the meter may be removed and the corresponding account canceled.

FIGS. 16A-16E illustrate a second example of measurement data analysis, according to some embodiments of the present technology. In one or more embodiments described herein, FIGS. 15A-15C may illustrate an example of detecting loss, such as technical or non-technical loss. In some embodiments described herein, FIGS. 15A-15C may illustrate an example of identifying groups of measurement devices with similar frequency content. In various embodiments, the second example of measurement data analysis may transform data in the time domain into data in the frequency domain (e.g., with a Fourier Transform), such as to perform spectral analysis. In many embodiments, the spectral analysis may utilize clustering in the frequency domain and/or principal component analysis (PCA) to identify groups of measurement devices with similar frequency content. Embodiments are not limited in this context.

In one or more embodiments, Fourier transforms may include a class of integral transformations which convert time series, or temporal data, into a representation based upon the sum of sine and cosine terms of varying amplitudes and frequencies. In some embodiments, applying the class of transformations to data received from measurement devices may provide a means for identifying exceptions or outliers. For instance, this method may provide detection of non-technical loss, such as meter bypasses, exchanged meters, illegal connections, and/or security breaches in transmitted data. An analytical approach to identify customers likely to fall into this category may include one or more of the following described with respect to a measurement device that includes a smart meter for customer electric usage.

In various embodiments, typical smart meter data may include customer electrical usage (e.g., in KWH) collected hourly in the time domain. However, in one or more embodiments, some time series may be better analyzed, viewed, understood in the frequency domain. For example, in order to monitor the "health" of rotating machinery accelerometers can be placed on machine components; resulting acceleration, velocity, and displacement vectors may then be monitored in the frequency domain to detect incipient failures. Similarly, electrical load profiles may contain deterministic periodic components characteristic of cycling equipment, such as refrigerators, air conditioners, and heating system. Load profiles containing these cycling loads may be broken down into periodic components by transforming the load profile from the time domain to the frequency domain using an integral transform, such as a discrete Fourier transform.

Figure 16B:
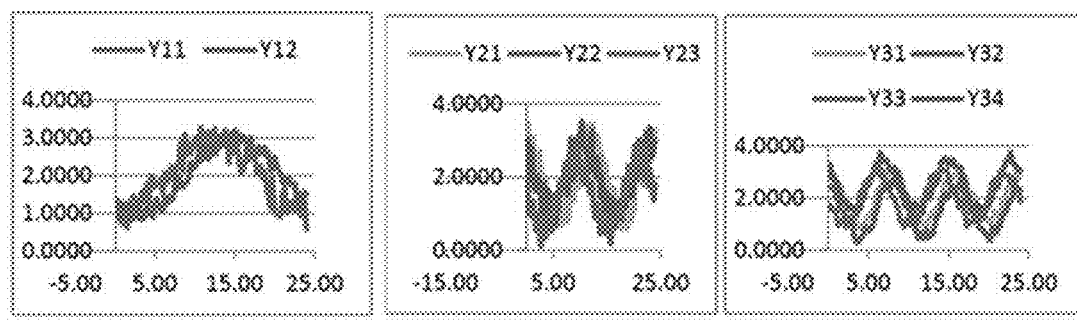

In many embodiments, MMDA system 1202 may be used to transform an analytically-generated time series (e.g., measurement data) to identify periodicities or cyclical patterns whose Fourier components are known. In some embodiments, clusters of times series with similar frequency content may be grouped using one or more methods to illustrate how customers with similar frequency content in their load profiles may be classified. In various embodiments, the evaluation and/or validation of measurement data may use a finite Fourier transform to decompose data series into a sum of sine and cosine functions with different amplitudes and wavelengths. In the illustrated embodiments, nine time-series are used as proxies for customer load profiles. Each profile, may be defined by the parameters indicated/illustrated in FIGS. 16A and 16B. Results may yield power spectral densities as a function of frequency for each of the load profiles, as shown in FIG. 16C.

In several embodiments, next, clustering in the frequency domain may be performed. For example, power spectral densities for all profile pairs may be correlated to determine which pairs include similar frequency content. In some embodiments, clusters may be extracted by sorting correlation coefficients for profile pairs in descending order and then profiles with significant p (e.g., $p<0.05$) and large correlation coefficients may be grouped. As shown in FIG. 16D, for example, column S_09 may be clustered with rows S_06, S_07, S_08, and S_09, which correspond to Y31, Y32, Y33, and Y34 of the time series, respectively. In many embodiments, this result may be expected because Y31 through T34 have the same frequency content, as shown in FIG. 16A.

In some embodiments, such as alternatively to correlation analysis of profile pairs described above, principal component analysis (PCA) of power spectral densities may be performed. PCAs may be helpful when numerous measures are collected on a number of observed variables which can be reduced to unobserved principal components. In many embodiments, PCA may be a variable reduction procedure where some variables used are highly correlated with one another. In various embodiments, PCA may create linear combinations of observations called principal components. Each of the cascading components may have a descending explanatory contribution for variance that is orthogonal (uncorrelated with) the preceding components. In some embodiments, principal components may be orthogonal because they are the eigen vectors of the covariance matrix, which is symmetric. However, the observable contribution to each component may not be interpretable if the component loadings are not clearly separated into distinct groups.

Figure 16E:
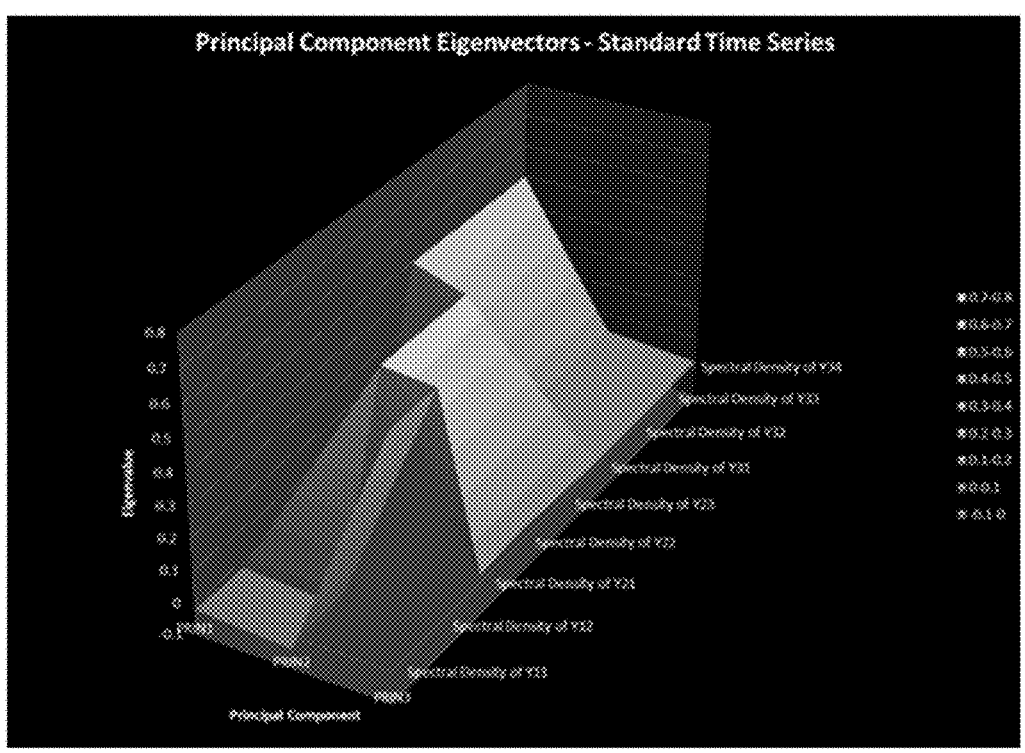

Referring to FIG. 16E, the result of the PCA for the spectral densities calculated for the nine time-series analyzed is shown. In some embodiments, PRIN 1 may have constituent components Y31, Y32, Y33, and Y34. In some such embodiments, these series may all have similar frequency components as defined analytically in FIG. 16A, which may be expected. Similar groupings occur for PRIN2 and PRIN3, as expected based on FIG. 16A.

In many embodiments, these transformation-clustering methods may be extended to actual load profiles making it possible to identify large groups of customers with similar frequency content in their load usage patterns in near real-time. In some embodiments, comparing these patters to known equipment cycling patters may also provide the ability to identify customers utilizing one or more of different equipment types, a vintage of equipment, or other extrinsic factors which influence usage and demand profiles. It will be appreciated that best practices for frequency domain analysis must be followed to obtain usable results. For example, refer to "Measurement and Analysis of Random Data" by Julius Bendat and Allan Piersol, John Wiley and Sons, Inc, New York, 1958.

Figure 17:
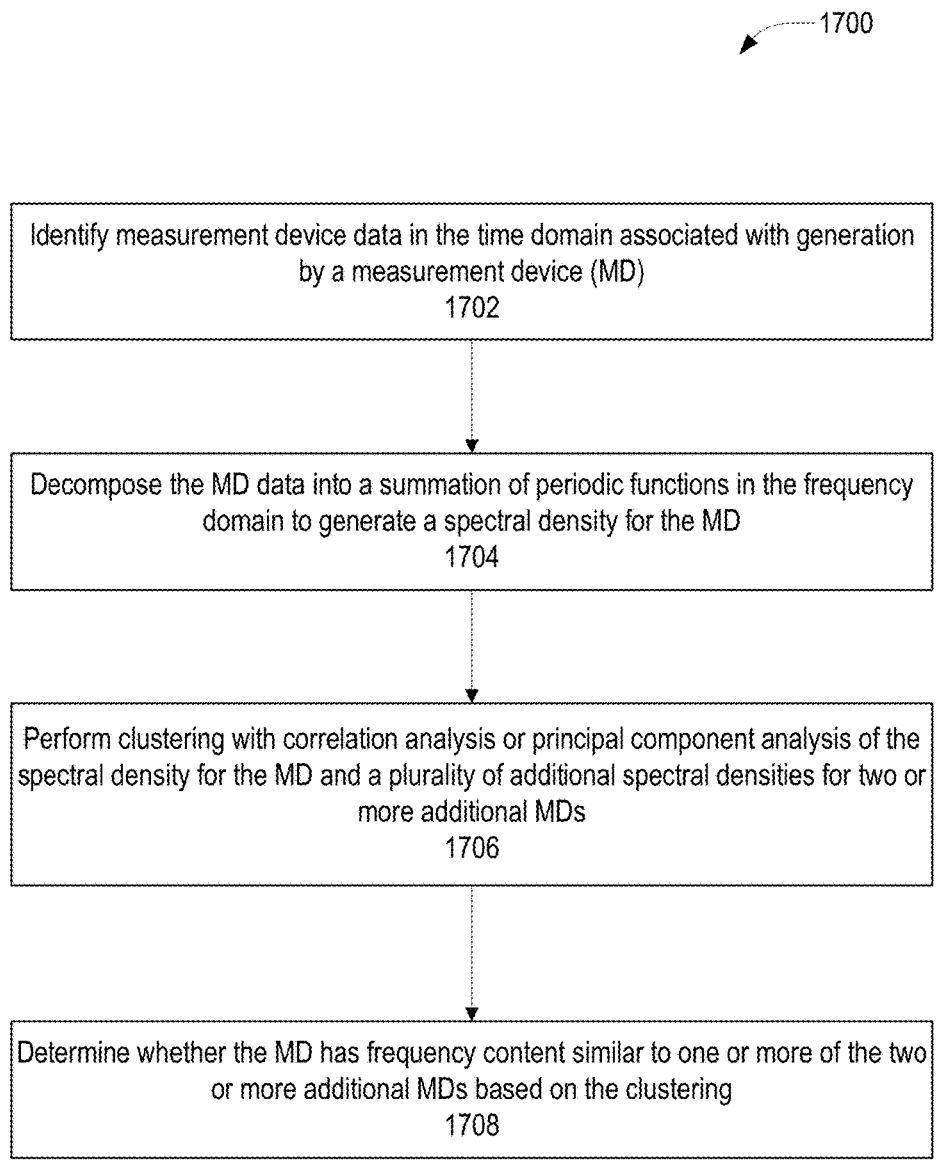
FIG. 17 illustrates a first example of a logic flow, according to some embodiments of the present technology.

FIG. 17 illustrates an embodiment of a logic flow 1700. The logic flow 1700 may be representative of some or all of the operations executed by one or more embodiments described herein. More specifically, the logic flow 1700 may illustrate operations performed by processing or logic circuitry used to implement one or more components described herein, such as MMDA system 1202. In one or more embodiments, these operations may be performed in conjunction with evaluation and/or validation of measurement data received from one or more measurement devices (e.g., MD 1210), such as to identify technical and/or non-technical losses. Embodiments are not limited in this context.

In the illustrated embodiment shown in FIG. 17, the logic flow 1700 may begin at block 1702. At block 1702, "identify measurement device data in the time domain associated with generation by a measurement device (MD)" MD data in the time domain associated with generation by a MD may be identified. For example, ESP engine 1240 of MMDA 1202 may identify direct MD data 1242 and/or indirect MD data 1244 in the time domain associated with generation by MD 1210. Proceeding to block 1704 "decompose the MD data into a summation of periodic functions in the frequency domain to generate a spectral density for the MD" the MD data may be decomposed into a summation of periodic functions in the frequency domain to generate a spectral density for the MD. For example, time-series data (see e.g., FIG. 16B) may be decomposed into a summation of sine and cosine functions to generate a corresponding spectral density (see e.g., FIG. 16C).

Continuing to block 1706 "perform clustering with correlation analysis or principal component analysis (PCA) of the spectral density for the MD and a plurality of additional spectral densities for two or more additional MDs" clustering with correlation analysis or PCA of the spectral density for the MD and a plurality of additional spectral densities for two or more additional MDs may be performed. For example, the spectral density clustering methodology illustrated and described with respect to one or more of FIGS. 16D and 16E may be performed. At block 1708 "determine whether the MD has frequency content similar to one or more of the two or more additional MDs based on the clustering" whether the MD has similar frequency content as one or more of the two or more additional MDs may be determined based on clustering. For instance, MDs with similar frequency content may be grouped together, such as by MMDA system 1202. In some embodiments, this may enable identification of MDs with unique or outlying MD data for further investigation, such as with respect to classification of the MD.

Figure 18:
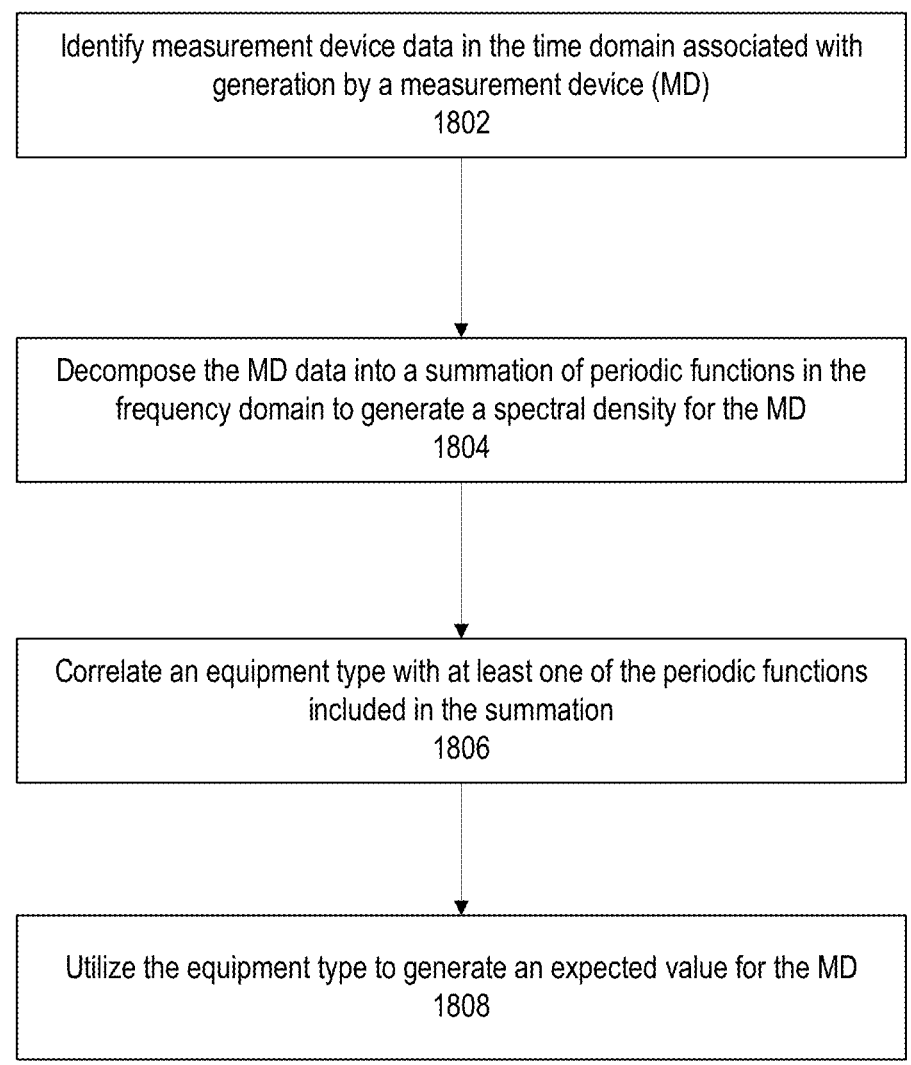
FIG. 18 illustrates a second example of a logic flow, according to some embodiments of the present technology.

FIG. 18 illustrates an embodiment of a logic flow 1800. The logic flow 1800 may be representative of some or all of the operations executed by one or more embodiments described herein. More specifically, the logic flow 1800 may illustrate operations performed by processing or logic circuitry used to implement one or more components described herein, such as MMDA system 1202. In one or more embodiments, these operations may be performed in conjunction with evaluation and/or validation of measurement data received from one or more measurement devices (e.g., MD 1210), such as to generate an expected value for the MD. Embodiments are not limited in this context.

In the illustrated embodiment shown in FIG. 18, the logic flow 1800 may begin at block 1802. At block 1802, "identify measurement device data in the time domain associated with generation by a measurement device (MD)" MD data in the time domain associated with generation by a MD may be identified. For example, ESP engine 1240 of MMDA 1202 may identify direct MD data 1242 and/or indirect MD data 1244 in the time domain associated with generation by MD 1210. Proceeding to block 1804 "decompose the MD data into a summation of periodic functions in the frequency domain to generate a spectral density for the MD" the MD data may be decomposed into a summation of periodic functions in the frequency domain to generate a spectral density for the MD. For example, time-series data (see e.g., FIG. 16B) may be decomposed into a summation of sine and cosine functions to generate a corresponding spectral density (see e.g., FIG. 16C).

At block 1806 "correlate an equipment type with at least one of the periodic functions included in the summation" an equipment type may be correlated with at least one of the periodic functions included in the summation. For example, the periodic functions included in the summation may be compared to known equipment cycling patterns. In such examples, when a known equipment cycling pattern matches one or more of the periodic function included in the summation, the equipment type associated with the matching known equipment cycling pattern may be correlated with the one or more periodic functions included in the summation. Continuing to block 1808 "utilize the equipment type to generate an expected value for the MD" the equipment type may be utilized to generate an expected value for the MD. For example, in one or more embodiments, the expected value may be generated for the MD by analytics engine 1280 and provided to ESP engine 1240 to validate, at least in part, received measurement data.

Figure 19A:
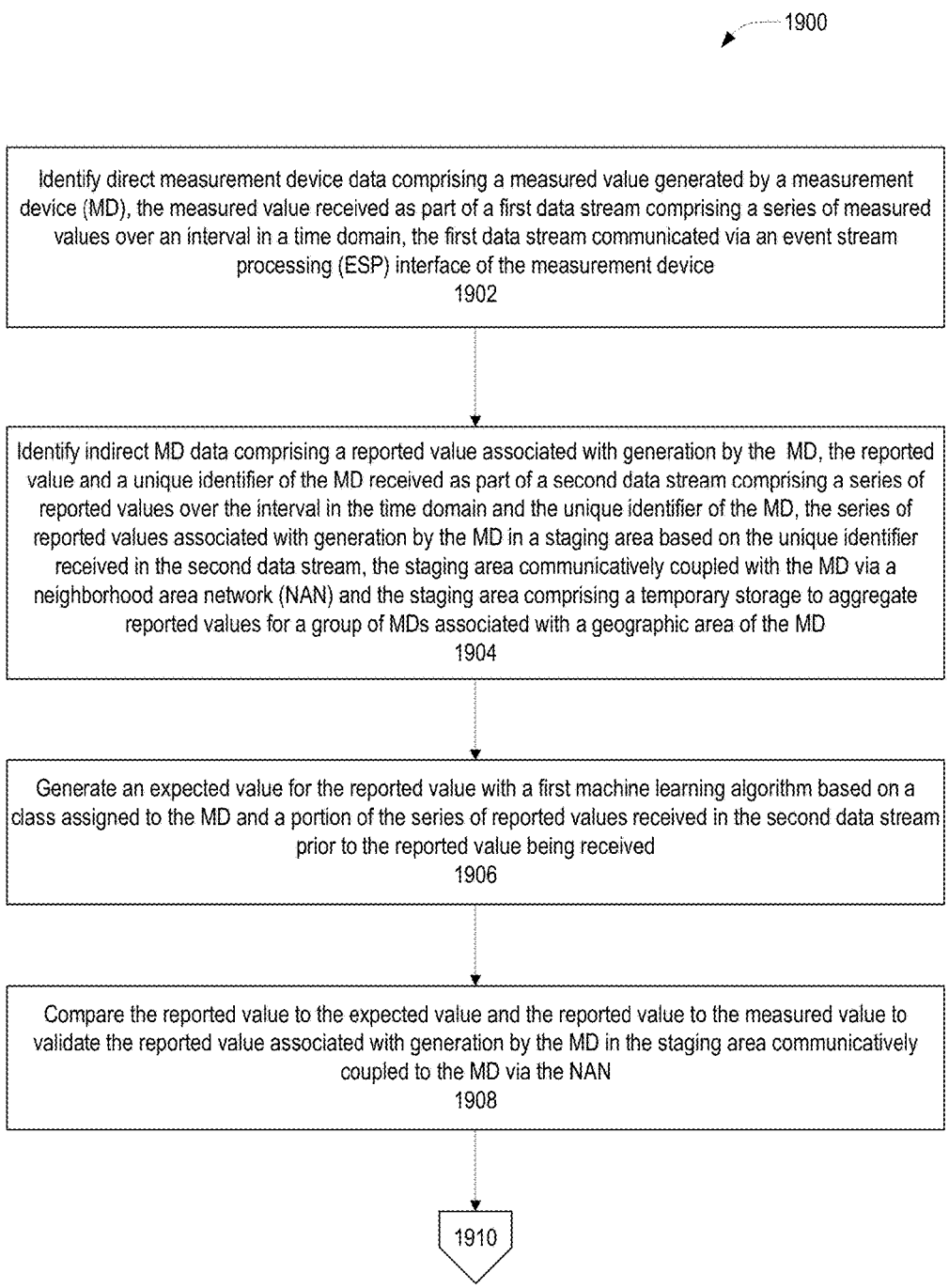

FIGS. 19A and 19B illustrate an embodiment of a logic flow 1900. The logic flow 1900 may be representative of some or all of the operations executed by one or more embodiments described herein. More specifically, the logic flow 1900 may illustrate operations performed by processing or logic circuitry used to implement one or more components described herein, such as MMDA system 1202. In one or more embodiments, these operations may be performed in conjunction with evaluation and/or validation of measurement data received from one or more measurement devices (e.g., MD 1210), such as to identify technical and/or non-technical losses. Embodiments are not limited in this context.

In the illustrated embodiment shown in FIG. 19, the logic flow 1900 may begin at block 1902. At block 1902, direct measurement device data comprising a measured value generated by a measurement device (MD) may be identified. For example, direct MD data 1242 including measured value 1452 may be identified by ESP engine 1240. In various embodiments, the measured value may be received as part of a first data stream comprising a series of measured values over an interval in a time domain. In many embodiments, the first data stream may be communicated via an event stream processing (ESP) interface of the measurement device. For instance, the first data stream may be communicated via ESP interface 1220.

Proceeding to block 1904, indirect MD data comprising a reported value associated with generation by the MD may be identified. For example, indirect MD data 1244 including reported value 1454 may be identified by ESP engine 1240. In various embodiments, the reported value may be received as part of a second data stream comprising a series of reported values over the interval in the time domain and a unique identifier of the MD. In many embodiments, the series of reported values may be associated with generation by the MD in a staging area based on the unique identifier received in the second data stream. In many such embodiments, the staging area may be communicatively coupled with the MD via a neighborhood area network (NAN) and the staging area may comprise a temporary storage to aggregate reported values for a group of MDs associated with a geographic are of the MD. For example, the series of reported values may be associated with generation by MD 1210 in staging area 1234 of NAN 1230 by using temporary storage 1232. In various embodiments, the staging area 1234 of NAN 1230 may aggregate reported values from MD set 1308.

Continuing to block 1906, an expected value for the reported value may be generated with a first machine learning algorithm based on a class assigned to the MD and a portion of the series of reported values received in the second data stream prior to the reported value being received. For example, expected value 1456 may be generated by analytics engine 1280. At block 1908, the reported value may be compared to the expected value and the reported value may be compared to the measured value to validate the reported value associated with generation by the MD in the staging area communicatively coupled to the MD via the NAN. For instance, event identifier 1446 of ESP engine 1240 may be used to compare the expected value 1456 to the reported value 1454 and the event identifier 1446 of ESP engine 1240 may be used to compare the measured value 1452 to the reported value 1454 to validate the reported value 1454. In some embodiments, the logic flow 1900 may conclude with block 1908. In other embodiments, the logic flow 1900 may proceed to block 1912 via block 1910.

At block 1912, at least one of the direct MD data and the indirect MD data may be transformed into the frequency domain to generate a spectral density for the MD. For instance, a Fourier transform may be used to transform one or more of direct MD data 1242 and indirect MD data 1244 from the time domain to the frequency domain. Proceeding to block 1914, the spectral density for the MD may be compared with a model spectral density that corresponds to the class assigned to the MD to verify the class assigned to the MD. In various embodiments, the model spectral density may be generated by a second machine learning algorithm with data from a set of MDs identified to characterize the class assigned to the MD.

Continuing to block 1916, a technical loss or a non-technical loss associated with the MD may be identified based on one or more of the validation of the reported value and the verification of the class associated with the MD. For example, a non-technical loss may be identified based on the reported value and the measured value not matching. In another example, a technical or non-technical loss may be identified based on the expected value and the reported value not matching within an acceptable threshold. Proceeding to block 1918, one or more corrective processes associated with the MD may be identified for performance based on whether technical loss or non-technical loss associated with the MD is identified. For example, additional monitoring may be identified as a corrective action for performance when a non-technical loss is identified. In another example, maintenance or replacement of the MD may be identified as a corrective action for performance when a technical loss is identified.

In various embodiments, processing circuitry 1450, 1484 and logic circuitry 1218 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, one or more of processing circuitry 1450, 1484 and logic circuitry 1218 may be selected to efficiently implement one or more techniques or features described herein. Alternatively, or additionally, the processors of one or more node devices may be selected to efficiently perform one or more operations described herein. In some embodiments, one or more operations described herein may be performed at least partially in parallel. By way of example, one or more of processing circuitry 1450, 1484 and logic circuitry 1218 or other processors may incorporate a single-instruction multiple-data (SIMD) architecture, may incorporate multiple processing pipelines, and/or may incorporate the ability to support multiple simultaneous threads of execution per processing pipeline.

In various embodiments, one or more portions of the processing or logic flows described herein, including the components of which each is composed, may be selected to be operative on whatever type of processor or processors that are selected to implement applicable ones of the one or more of processing circuitry 1450, 1484, logic circuitry 1218, or other processors utilized by one or more components described herein. In various embodiments, each of these one or more portions of the processing or logic flows described herein may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for one or more of processing circuitry 1450, 1484, logic circuitry 1218, or other processors. Where one or more device drivers are included, those device drivers may provide support for any of a variety of other components, whether hardware or software components, described herein.

In various embodiments, each of the storage temporary storage 1232, database 1270, and other memories required (although not necessarily explicitly shown) for processing circuitry 1450, 1484 and logic circuitry 1218 to implement functionalities described herein may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid-state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). However, in a specific embodiment, the database 1270 may be implemented with a redundant array of independent discs (RAID) of a RAID level selected to provide fault tolerance to prevent loss of one or more of these datasets and/or to provide increased speed in accessing one or more of these datasets.

In various embodiments, one or more interfaces (e.g., a graphical user interface (GUI)) may be used in conjunction with carrying out techniques or features described herein. In various such embodiments, the one or more interfaces may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, displays, such as for displaying a GUI, may be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, one or more of the interfaces may be a touchscreen display.

In various embodiments, one or more of NAN interface 1218, ESP interface 1220, and communication circuitry 1216 (as well as corresponding components for ESP engine 1240, NAN 1230, and/or RAN 1334) may include one or more network interfaces that employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. However, in a specific embodiment, one or more interfaces may be implemented with multiple copper-based or fiber-optic based network interface ports to provide redundant and/or parallel pathways in exchanging data.

In various embodiments, the processing and/or storage resources of one or more components described herein, such as ESP engine 1240, database 1270, and/or analytics engine 1280 may be divided among the multiple systems. In various such embodiments, one or more API architectures may support communications among the multiple systems. The one or more API architectures may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data among multiple systems is not dependent on, nor constrained by, existing API architectures and/or supporting communications protocols. More broadly, there is nothing in the manner in which the data may be organized in storage, transmission and/or distribution via one or more interfaces described herein that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
   identify direct measurement device data comprising a measured value generated by a measurement device (MD), the measured value received as part of a first data stream comprising a series of measured values over an interval in a time domain, the first data stream communicated via an event stream processing (ESP) interface of the measurement device;
   identify indirect MD data comprising a reported value associated with generation by the MD, the reported value and a unique identifier of the MD received as part of a second data stream comprising a series of reported values over the interval in the time domain and the unique identifier of the MD, the series of reported values associated with generation by the MD in a staging area based on the unique identifier received in the second data stream, the staging area communicatively coupled with the MD via a neighborhood area network (NAN) and the staging area comprising a temporary storage to aggregate reported values for a group of MDs associated with a geographic area of the MD;
   generate an expected value for the reported value with a first machine learning algorithm based on a class assigned to the MD and a portion of the series of reported values received in the second data stream prior to the reported value being received;
   compare the reported value to the expected value and the reported value to the measured value to validate the reported value associated with generation by the MD in the staging area communicatively coupled to the MD via the NAN;
   transform at least one of the direct MD data and the indirect MD data into the frequency domain to generate a spectral density for the MD;

compare the spectral density for the MD with a model spectral density that corresponds to the class assigned to the MD to verify the class assigned to the MD, wherein the model spectral density is generated by a second machine learning algorithm with data from a set of MDs identified to characterize the class assigned to the MD;

identify a technical loss or a non-technical loss associated with the MD based on one or more of the validation of the reported value and the verification of the class associated with the MD; and determine one or more corrective processes associated with the MD to perform based on whether technical loss or non-technical loss associated with the MD is identified.

2. The apparatus of claim 1, wherein the processor is caused to perform operations comprising decomposing the at least one of the direct MD data and the indirect MD data into a summation of periodic functions to transform the at least one of the direct MD data and the indirect MD data into the frequency domain to generate the spectral density for the MD.

3. The apparatus of claim 2, wherein the processor is caused to perform operations comprising:

correlate an equipment type with at least one of the periodic functions included in the summation; and utilize the equipment type to generate the expected value for the reported value.

4. The apparatus of claim 2, wherein the processor is caused to perform operations to compare of the spectral density for the MD with the model spectral density that corresponds to the class assigned to the MD to verify the class assigned to the MD comprising:

perform clustering with correlation analysis or principal component analysis of the spectral density for the MD and a plurality of additional spectral densities for the set of MDs identified to characterize the class assigned to the MD; and determine whether the MD has similar frequency content similar to one or more of the set of MDs identified to characterize the class assigned to the MD based on the clustering.

5. The apparatus of claim 1, wherein the reported value is aggregated in a second staging area communicatively coupled to the staging area in the NAN by a regional area network (RAN) prior to receival as part of the second live steam, the second staging area comprising a temporary storage to aggregate reported values for a second group of MDs associated with a geographic region of the MD, the geographic region of the MD comprising the geographic area of the MD and a second geographic area of at least one other MD.

6. The apparatus of claim 1, wherein the processor is caused to perform operations comprising combine the first data stream and the second data stream into a data record stream associated with the MD, wherein the data record stream is provided to a database for storage, and wherein the first and second machine learning algorithms are trained with data stored in the database as part of a plurality of data record streams associated with a plurality of MDs.

7. The apparatus of claim 6, wherein the data from the set of MDs identified to characterize the class assigned to the MD used by the second machine learning algorithm to generate the model spectral density was stored in the database as part of a respective data record streams corresponding to each of the set of MDs identified to characterize the class assigned to the MD.

8. The apparatus of claim 6, wherein training at least one of the first and second machine learning algorithms utilizes one or more of support vector machines (SVMs), Fourier transforms, logistic regression, deep neural networks (DNNs), principal component analysis (PCA), clustering in the frequency domain.

9. The apparatus of claim 1, wherein the processor is caused to perform operations comprising identify a non-technical loss associated with the MD based on verification of the reported value indicating the reported value exceeds the measured value.

10. The apparatus of claim 1, wherein the processor is caused to perform operations comprising assign the class to the MD based on one or more properties of a client account that corresponds to the MD.

11. A computer-implemented method, comprising:

identifying direct measurement device data comprising a measured value generated by a measurement device (MD), the measured value received as part of a first data stream comprising a series of measured values over an interval in a time domain, the first data stream communicated via an event stream processing (ESP) interface of the measurement device;

identifying indirect MD data comprising a reported value associated with generation by the MD, the reported value and a unique identifier of the MD received as part of a second data stream comprising a series of reported values over the interval in the time domain and the unique identifier of the MD, the series of reported values associated with generation by the MD in a staging area based on the unique identifier received in the second data stream, the staging area communicatively coupled with the MD via a neighborhood area network (NAN) and the staging area comprising a temporary storage to aggregate reported values for a group of MDs associated with a geographic area of the MD;

generating an expected value for the reported value with a first machine learning algorithm based on a class assigned to the MD and a portion of the series of reported values received in the second data stream prior to the reported value being received;

comparing the reported value to the expected value and the reported value to the measured value to validate the reported value associated with generation by the MD in the staging area communicatively coupled to the MD via the NAN;

transforming at least one of the direct MD data and the indirect MD data into the frequency domain to generate a spectral density for the MD;

comparing the spectral density for the MD with a model spectral density that corresponds to the class assigned to the MD to verify the class assigned to the MD, wherein the model spectral density is generated by a second machine learning algorithm with data from a set of MDs identified to characterize the class assigned to the MD;

identifying a technical loss or a non-technical loss associated with the MD based on one or more of the validation of the reported value and the verification of the class associated with the MD; and determining one or more corrective processes associated with the MD to perform based on whether technical loss or non-technical loss associated with the MD is identified.

12. The computer-implemented method of claim 11, comprising decomposing the at least one of the direct MD data and the indirect MD data into a summation of periodic functions to transform the at least one of the direct MD data and the indirect MD data into the frequency domain to generate the spectral density for the MD.

13. The computer-implemented method of claim 12, comprising:
correlating an equipment type with at least one of the periodic functions included in the summation; and
utilizing the equipment type to generate the expected value for the reported value.

14. The computer-implemented method of claim 12, wherein comparing of the spectral density for the MD with the model spectral density that corresponds to the class assigned to the MD to verify the class assigned to the MD comprises:
performing clustering with correlation analysis or principal component analysis of the spectral density for the MD and a plurality of additional spectral densities for the set of MDs identified to characterize the class assigned to the MD; and
determining whether the MD has similar frequency content similar to one or more of the set of MDs identified to characterize the class assigned to the MD based on the clustering.

15. The computer-implemented method of claim 11, wherein the reported value is aggregated in a second staging area communicatively coupled to the staging area in the NAN by a regional area network (RAN) prior to receival as part of the second live steam, the second staging area comprising a temporary storage to aggregate reported values for a second group of MDs associated with a geographic region of the MD, the geographic region of the MD comprising the geographic area of the MD and a second geographic area of at least one other MD.

16. The computer-implemented method of claim 11, comprising combining the first data stream and the second data stream into a data record stream associated with the MD, wherein the data record stream is provided to a database for storage, and wherein the first and second machine learning algorithms are trained with data stored in the database as part of a plurality of data record streams associated with a plurality of MDs.

17. The computer-implemented method of claim 16, wherein the data from the set of MDs identified to characterize the class assigned to the MD used by the second machine learning algorithm to generate the model spectral density was stored in the database as part of a respective data record streams corresponding to each of the set of MDs identified to characterize the class assigned to the MD.

18. The computer-implemented method of claim 16, wherein training at least one of the first and second machine learning algorithms utilizes one or more of support vector machines (SVMs), Fourier transforms, logistic regression, deep neural networks (DNNs), principal component analysis (PCA), clustering in the frequency domain.

19. The computer-implemented method of claim 11, comprising identifying a non-technical loss associated with the MD based on verification of the reported value indicating the reported value exceeds the measured value.

20. The computer-implemented method of claim 11, comprising assigning the class to the MD based on one or more properties of a client account that corresponds to the MD.

21. A computer-program product tangibly embodied in a non-transitory machine-readable storage medium, the computer-program product including instructions operable to cause a processor to perform operations comprising:

identify direct measurement device data comprising a measured value generated by a measurement device (MD), the measured value received as part of a first data stream comprising a series of measured values over an interval in a time domain, the first data stream communicated via an event stream processing (ESP) interface of the measurement device;
identify indirect MD data comprising a reported value associated with generation by the MD, the reported value and a unique identifier of the MD received as part of a second data stream comprising a series of reported values over the interval in the time domain and the unique identifier of the MD, the series of reported values associated with generation by the MD in a staging area based on the unique identifier received in the second data stream, the staging area communicatively coupled with the MD via a neighborhood area network (NAN) and the staging area comprising a temporary storage to aggregate reported values for a group of MDs associated with a geographic area of the MD;
generate an expected value for the reported value with a first machine learning algorithm based on a class assigned to the MD and a portion of the series of reported values received in the second data stream prior to the reported value being received;
compare the reported value to the expected value and the reported value to the measured value to validate the reported value associated with generation by the MD in the staging area communicatively coupled to the MD via the NAN;
transform at least one of the direct MD data and the indirect MD data into the frequency domain to generate a spectral density for the MD;
compare the spectral density for the MD with a model spectral density that corresponds to the class assigned to the MD to verify the class assigned to the MD, wherein the model spectral density is generated by a second machine learning algorithm with data from a set of MDs identified to characterize the class assigned to the MD;
identify a technical loss or a non-technical loss associated with the MD based on one or more of the validation of the reported value and the verification of the class associated with the MD; and
determine one or more corrective processes associated with the MD to perform based on whether technical loss or non-technical loss associated with the MD is identified.

22. The computer-program product of claim 21, including instructions operable to cause the processor to perform operations comprising decomposing the at least one of the direct MD data and the indirect MD data into a summation of periodic functions to transform the at least one of the direct MD data and the indirect MD data into the frequency domain to generate the spectral density for the MD.

23. The computer-program product of claim 22, including instructions operable to cause the processor to perform operations comprising:
correlate an equipment type with at least one of the periodic functions included in the summation; and
utilize the equipment type to generate the expected value for the reported value.

24. The computer-program product of claim 22, including instructions operable to cause the processor to perform operations to compare of the spectral density for the MD with the model spectral density that corresponds to the class assigned to the MD to verify the class assigned to the MD comprising:
- perform clustering with correlation analysis or principal component analysis of the spectral density for the MD and a plurality of additional spectral densities for the set of MDs identified to characterize the class assigned to the MD; and
- determine whether the MD has similar frequency content similar to one or more of the set of MDs identified to characterize the class assigned to the MD based on the clustering.

25. The computer-program product of claim 21, wherein the reported value is aggregated in a second staging area communicatively coupled to the staging area in the NAN by a regional area network (RAN) prior to receival as part of the second live steam, the second staging area comprising a temporary storage to aggregate reported values for a second group of MDs associated with a geographic region of the MD, the geographic region of the MD comprising the geographic area of the MD and a second geographic area of at least one other MD.

26. The computer-program product of claim 21, including instructions operable to cause the processor to perform operations comprising combine the first data stream and the second data stream into a data record stream associated with the MD, wherein the data record stream is provided to a database for storage, and wherein the first and second machine learning algorithms are trained with data stored in the database as part of a plurality of data record streams associated with a plurality of MDs.

27. The computer-program product of claim 26, wherein the data from the set of MDs identified to characterize the class assigned to the MD used by the second machine learning algorithm to generate the model spectral density was stored in the database as part of a respective data record streams corresponding to each of the set of MDs identified to characterize the class assigned to the MD.

28. The computer-program product of claim 26, wherein training at least one of the first and second machine learning algorithms utilizes one or more of support vector machines (SVMs), Fourier transforms, logistic regression, deep neural networks (DNNs), principal component analysis (PCA), clustering in the frequency domain.

29. The computer-program product of claim 21, including instructions operable to cause the processor to perform operations comprising identify a non-technical loss associated with the MD based on verification of the reported value indicating the reported value exceeds the measured value.

30. The computer-program product of claim 21, including instructions operable to cause the processor to perform operations comprising assign the class to the MD based on one or more properties of a client account that corresponds to the MD.

* * * * *